(12) United States Patent
Tokunaga et al.

(10) Patent No.: US 8,739,417 B2
(45) Date of Patent: *Jun. 3, 2014

(54) CIRCULAR SAW

(75) Inventors: Manabu Tokunaga, Anjo (JP); Shinji Hirabayashi, Anjo (JP); Ryu Hashimoto, Anjo (JP)

(73) Assignee: Makita Corporation, Anjo-shi (JP)

( * ) Notice: Subject to any disclaimer, the term of this patent is extended or adjusted under 35 U.S.C. 154(b) by 474 days.

This patent is subject to a terminal disclaimer.

(21) Appl. No.: 12/996,838

(22) PCT Filed: Jun. 9, 2009

(86) PCT No.: PCT/JP2009/060558
§ 371 (c)(1),
(2), (4) Date: Feb. 28, 2011

(87) PCT Pub. No.: WO2009/151064
PCT Pub. Date: Dec. 17, 2009

(65) Prior Publication Data
US 2011/0167651 A1 Jul. 14, 2011

(30) Foreign Application Priority Data

Jun. 10, 2008 (JP) ................. 2008-152146
Jun. 10, 2008 (JP) ................. 2008-152167

(51) Int. Cl.
*B23D 45/16* (2006.01)
(52) U.S. Cl.
USPC .................... 30/388; 30/263; 74/343; 74/368
(58) Field of Classification Search
USPC ........... 30/228, 173, 249, 383, 263, 388, 389, 30/390; 74/343, 368
See application file for complete search history.

(56) References Cited

U.S. PATENT DOCUMENTS 1,396,512 A * 11/1921 Fergusson ........................ 74/343
3,713,217 A * 1/1973 Frederick et al. ............... 30/287
(Continued)

FOREIGN PATENT DOCUMENTS

CN 2292902 Y 9/1998
CN 1427756 A 7/2003
(Continued)

OTHER PUBLICATIONS

International Search Report dated Sep. 1, 2009 in corresponding International Application No. PCT/JP2009/060558 (with translation).

(Continued)

*Primary Examiner* — Omar Flores Sanchez
(74) *Attorney, Agent, or Firm* — Oliff PLC

(57) ABSTRACT

A circular saw in which cutting speed of a saw blade is smoothly controlled. A speed change mechanism of a circular saw includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft. A torque transmission path via the first gear train is defined as a first power transmission path and a torque transmission path via the second gear train is defined as a second power transmission path, and the transmission path is switched between the first power transmission path and the second power transmission path.

12 Claims, 22 Drawing Sheets

(56) References Cited

U.S. PATENT DOCUMENTS

| | | | |
|---|---|---|---|
| 3,808,904 A | | 5/1974 | Gotsch et al. |
| 3,858,317 A | * | 1/1975 | Ford et al. .......................... 30/92 |
| 4,201,103 A | | 5/1980 | Salje et al. |
| 4,710,071 A | * | 12/1987 | Koehler et al. ............... 408/133 |
| 4,952,249 A | | 8/1990 | Dambre |
| 5,239,758 A | * | 8/1993 | Lindell .......................... 30/500 |
| 5,967,934 A | | 10/1999 | Ishida et al. |
| 5,992,257 A | * | 11/1999 | Nemetz et al. ................. 74/371 |
| 7,854,274 B2 | * | 12/2010 | Trautner et al. ................. 173/48 |
| 8,167,054 B2 | * | 5/2012 | Nakashima et al. ............ 173/48 |
| 8,172,004 B2 | * | 5/2012 | Ho ................................. 173/176 |
| 8,292,001 B2 | * | 10/2012 | Trautner ......................... 173/48 |
| 2007/0240531 A1 | | 10/2007 | Endo et al. |

FOREIGN PATENT DOCUMENTS

| | | |
|---|---|---|
| GB | 2 399 148 A | 9/2004 |
| GB | 2 424 249 A | 9/2006 |
| JP | B2-56-042403 | 10/1981 |
| JP | U-58-17926 | 2/1983 |
| JP | A-1-99714 | 4/1989 |
| JP | A-3-221401 | 9/1991 |
| JP | U-4-79017 | 7/1992 |
| JP | U-04-079017 | 7/1992 |
| JP | U-3009160 | 3/1995 |
| JP | A-07-217709 | 8/1995 |
| JP | A-2007-290235 | 11/2007 |
| RU | 2 252 348 C1 | 5/2005 |
| SU | 1079168 A | 3/1984 |
| TW | 156581 | 4/1991 |
| WO | WO 01/85399 A1 | 11/2001 |
| WO | WO 02/059491 A2 | 8/2002 |

OTHER PUBLICATIONS

Supplementary European Search Report issued for Application No. EP 09 76 2494.4 on Jan. 31, 2012.

International Preliminary Report on Patentability issued for International Application No. PCT/JP2009/060558 on Dec. 13, 2010 (with translation).

Office Action issued in Chinese Patent Application No. 200980121596.8 dated May 3, 2012 (with translation).

Sep. 4, 2012 Office Action issued in Japanese Patent Application No. 2008-152167 (with translation).

May 23, 2013 Decision to Grant issued in Russian Application No. 201053877/2(077884) (w/ English Translation).

* cited by examiner

CIRCULAR SAW

FIELD OF THE INVENTION

The invention relates to a circular saw for cutting a workpiece.

BACKGROUND OF THE INVENTION

Japanese non-examined patent publication H01-99714 discloses a circular saw for cutting a workpiece. This known circular saw is capable of varying the cutting speed of a saw blade according to the cutting area of a workpiece or other similar factors. In designing a circular saw of this type for cutting a workpiece, however, it is required to provide a technique for allowing smooth control of the cutting speed of a saw blade in response to actual cutting operation in order to improve smoothness of the cutting operation.

SUMMARY OF THE INVENTION

It is, accordingly, an object of the invention to provide a circular saw in which cutting speed of a saw blade is smoothly controlled.

SUMMARY OF THE INVENTION

In order to solve the above-described problem, a circular saw according to the invention includes at least a power source, a saw blade which is rotationally driven to cut a workpiece, and a speed change mechanism which is disposed between the power source and the saw blade. The speed change mechanism changes rotation speed of the saw blade. As the "circular saw" here, a circular saw for woodworking, metalworking or ceramics or for cutting plastic can be suitably used, and the "circular saw" here includes a transportable circular saw and a tabletop circular saw circular. Further, the "saw blade" here widely includes a chip saw, a blade, a cutting grinding wheel and a diamond wheel. The "power source" here typically represents an electric motor, but it suitably includes other motors such as an air motor and an engine.

In this invention, particularly, the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft. A torque transmission path via the first gear train is defined as a first power transmission path and a torque transmission path via the second gear train is defined as a second power transmission path. The transmission path is switched between the first power transmission path and the second power transmission path. One of the first and second power transmission paths is typically defined as a high-speed low-torque power transmission path and the other as a low-speed high-torque power transmission path. In such construction, the gear ratio (speed reduction ratio) of the first gear train forming a component of the first power transmission path is different from the gear ratio of the second gear train forming a component of the second power transmission path. Therefore, by switching between the first power transmission path and the second power transmission path, the operation can be performed at high speed and low torque, for example, by using the first power transmission path having a small gear ratio, for example, when a load applied to the saw blade is low. On the other hand, when the load applied to the saw blade is high, the operation can be performed at low speed and high torque by using the second power transmission path having a high gear ratio.

Further, switching between the first power transmission path and the second power transmission path may be automatically performed based on actually detected torque information, or it may be manually performed by user's operation of an operation member.

According to a preferred aspect of the invention, the circular saw further includes a first clutch which allows and interrupts power transmission on the first power transmission path and a second clutch which allows and interrupts power transmission on the second power transmission path. The power transmission path is switched between the first and second power transmission paths while the first and second gear trains are held engaged, by shifting of the first and second clutches between the power transmission state and the power transmission interrupted state. Further, the manner in which "the power transmission path is switched between the first and second power transmission paths while the first and second gear trains are held engaged" in this invention represents the manner in which the power transmission path is switched between the first and second power transmission paths while the position of the gears engaged with each other is fixed, or specifically, the manner in which, when one clutch is shifted to the power transmission state, the other clutch is shifted to the power transmission interrupted state, and when one clutch is shifted to the power transmission interrupted state, the other clutch is shifted to the power transmission state. With such a construction, the power transmission path can be switched between the first and second power transmission paths while the gear trains in engagement are fixed in position. Therefore, speed changing operation can be performed with increased smoothness. Particularly, in the case of a construction in which gears to be engaged are shifted for speed change by sliding gears along a shaft, like the known speed change mechanism, a rattle may be caused due to a clearance between mating surfaces of the shaft and the gears, so that wear is easily caused and the gears have a problem in durability. Further, during shift of engagement of the gears, on the verge of disengagement of the gears and in the early stage of engagement of the gears, a very small area of a tooth face is subjected to torque, so that a problem in strength, such as chipping and wear of the teeth, arises. Further, when the gears are engaged, noise may also be caused due to interference of the teeth. According to this aspect, however, with the construction in which the gears are normally engaged, the above-mentioned problems of the known technique in which the gears to be engaged are shifted can be solved.

According to a preferred aspect of the invention, the circular saw further includes an input shaft which is driven by the power source, and the input shaft is connected to the first rotating shaft by engagement of gears, while the second rotating shaft comprises an output shaft of the saw blade. The circular saw is of a parallel three-shaft type in which the input shaft is also disposed parallel to the parallel first and second rotating shafts. Specifically, in this construction, the three shafts, or the input shaft, the output shaft of the saw blade in the form of the second rotating shaft and the intermediate shaft in the form of the first rotating shaft disposed between the input shaft and the output shaft. With such a construction, gears are engaged between the input shaft and the first rotating shaft and between the first rotating shaft and the second rotating shaft, so that the variety of settings of the speed reduction ratio can be increased compared with a construction using a speed reducing structure formed only by the first and second rotating shafts.

According to a preferred aspect of the circular saw of the invention, at least one of the first and second clutches comprises a drive side clutch member and a driven side clutch member which are opposed to each other on the first or second rotating shaft, and one of the drive side clutch member and the driven side clutch member comprises a sliding engagement clutch which can slide in a longitudinal direction between a power transmission position in which the clutch members are placed in the power transmission state by engagement with each other and a power transmission interrupted position in which the clutch members are placed in the power transmission interrupted state by disengagement from each other, according to torque on the saw blade. With such a construction, in the circular saw, an automatic shift clutch which automatically shifts between the power transmission state and the power transmission interrupted state according to the torque on the saw blade is provided in the form of the sliding engagement clutch.

According to a preferred aspect of the circular saw of the invention, the speed change mechanism includes a latching mechanism, and once the sliding engagement clutch is shifted to the power transmission interrupted state, the latching mechanism retains the shifted state. With such a construction, by using the latching mechanism, frequent occurrence of such shifting around a switching torque can be prevented.

According to a preferred aspect of the invention, the speed change mechanism includes a reset mechanism that returns the sliding engagement clutch to the power transmission state when the power source is stopped. With such a construction, rationally, it can be made ready for the next cutting operation to be performed after the power source is stopped.

According to a preferred aspect of the invention, the speed change mechanism further includes a switching preventing mechanism which prevents the sliding engagement clutch from shifting between the power transmission state and the power transmission interrupted state by inertia of the saw blade at the time of startup of the power source. When the saw blade has a large mass and great inertia, the sliding engagement clutch may malfunction, or particularly shift from the power transmission state to the power transmission interrupted state and cause speed change. By provision of the above-described switching preventing mechanism, however, malfunctioning at the time of startup of the power source can be prevented.

According to a preferred aspect of the invention, the speed change mechanism further includes a switching set value adjusting mechanism which is operated by a user, and the switching set value adjusting mechanism adjusts a switching set value at which the transmission path is switched between the power transmission state and the power transmission interrupted state. With such a construction, by provision of the switching set value adjusting mechanism, the switching set value can be adjusted, so that the timing of switching of the torque transmission path can be obtained as the user requires.

Further, according to the invention, preferably, the speed change mechanism offers a first setting mode and a second setting mode. In the first mode, an output power characteristic or efficiency characteristic of the saw blade within a normal torque range between a minimum torque and a maximum torque is plotted in a generally inverted U-shaped first characteristic curve having at least one peak in a region of torque lower than an intermediate torque between the minimum torque and the maximum torque. In the second setting mode, this characteristic is plotted in a generally inverted U-shaped second characteristic curve having at least one peak in a region of torque higher than the intermediate torque between the minimum torque and the maximum torque. The minimum torque is typically defined based on the minimum cutting depth of cutting the workpiece by the saw blade, and a maximum torque is typically defined based on the maximum cutting depth of cutting the workpiece by the saw blade. Further, the torque may be defined not only based on the depth of cutting the workpiece, but based on the kind of materials of the workpiece or the way of cutting the workpiece (square cutting, oblique cutting, etc.).

By provision of the speed change mechanism which offers at least the first setting mode and the second setting mode, cutting operation can be smoothly performed in response to change of load torque produced during cutting operation. Compared with a speed change mechanism which is placed only in either one of the two setting modes, the output power and the efficiency can be stabilized at higher levels. Particularly, in the first setting mode during light load conditions, the rotation speed of the saw blade can be increased, while, in the second setting mode during heavy load conditions, high torque can be set.

Further, switching between the first setting mode and the second setting mode may be automatically performed based on actually detected torque information, or it may be manually performed by user's operation of an operation member.

Further, in a circular saw according to a further aspect of the invention, in the speed change mechanism, preferably, a ratio of a second torque at the peak of the second characteristic curve in the second setting mode to a first torque at the peak of the first characteristic curve in the first setting mode is 1.5 to 2.5. With such a construction, the speed change mechanism which can more smoothly perform speed changing operation can be realized for practical use.

Further, in the circular saw according to a further aspect of the invention, the speed change mechanism has a first power transmission path and a second power transmission path. The first power transmission path is provided to transmit torque of an input shaft which is driven by the power source to an output shaft of the saw blade in the first setting mode, and includes a first drive gear which is connected to the input shaft, and a first driven gear which is engaged with the first drive gear and connected to the output shaft. The second power transmission path is provided to transmit torque of the input shaft to the output shaft of the saw blade in the second setting mode, and includes a second drive gear which is connected to the input shaft, and a second driven gear which is engaged with the second drive gear and connected to the output shaft. Particularly in the speed change mechanism, preferably, a ratio of a second gear ratio of the second driven gear to the second drive gear to a first gear ratio of the first driven gear to the first drive gear is 1.5 to 2.5. With such a construction, the speed change mechanism which can more smoothly perform speed changing operation can be realized for practical use.

Further, the circular saw according to a further aspect of the invention preferably includes a detecting mechanism for detecting torque on the saw blade. The "detecting mechanism" here widely includes a mechanical detecting mechanism, for example, using a spring, or an electrical detecting mechanism, for example, using a sensor for detecting torque continuously or intermittently. In this construction, the speed change mechanism switches from the first setting mode to the second setting mode when the detected torque exceeds the intermediate torque, while it switches from the second setting mode to the first setting mode when the detected torque decreases to below the intermediate torque. With such a construction, rationally, switching between the first setting mode and the second setting mode can be automatically performed according to the load. Further, in order to prevent frequent occurrence of the switching around a switching torque, preferably, a function of retaining the second setting mode is provided.

According to the invention, smoother cutting operation can be realized by allowing smooth control of the cutting speed of a saw blade within the circular saw.

BRIEF DESCRIPTION OF THE DRAWINGS

FIG. 11 illustrates the movement of the sliding engagement clutch, in which FIG. 11(A) shows the movement of cams and FIG. 11(B) shows the movement of the torque ring provided as a latching member.

DETAILED DESCRIPTION OF THE REPRESENTATIVE EMBODIMENT OF THE INVENTION

First Embodiment of the Invention

Figure 1:
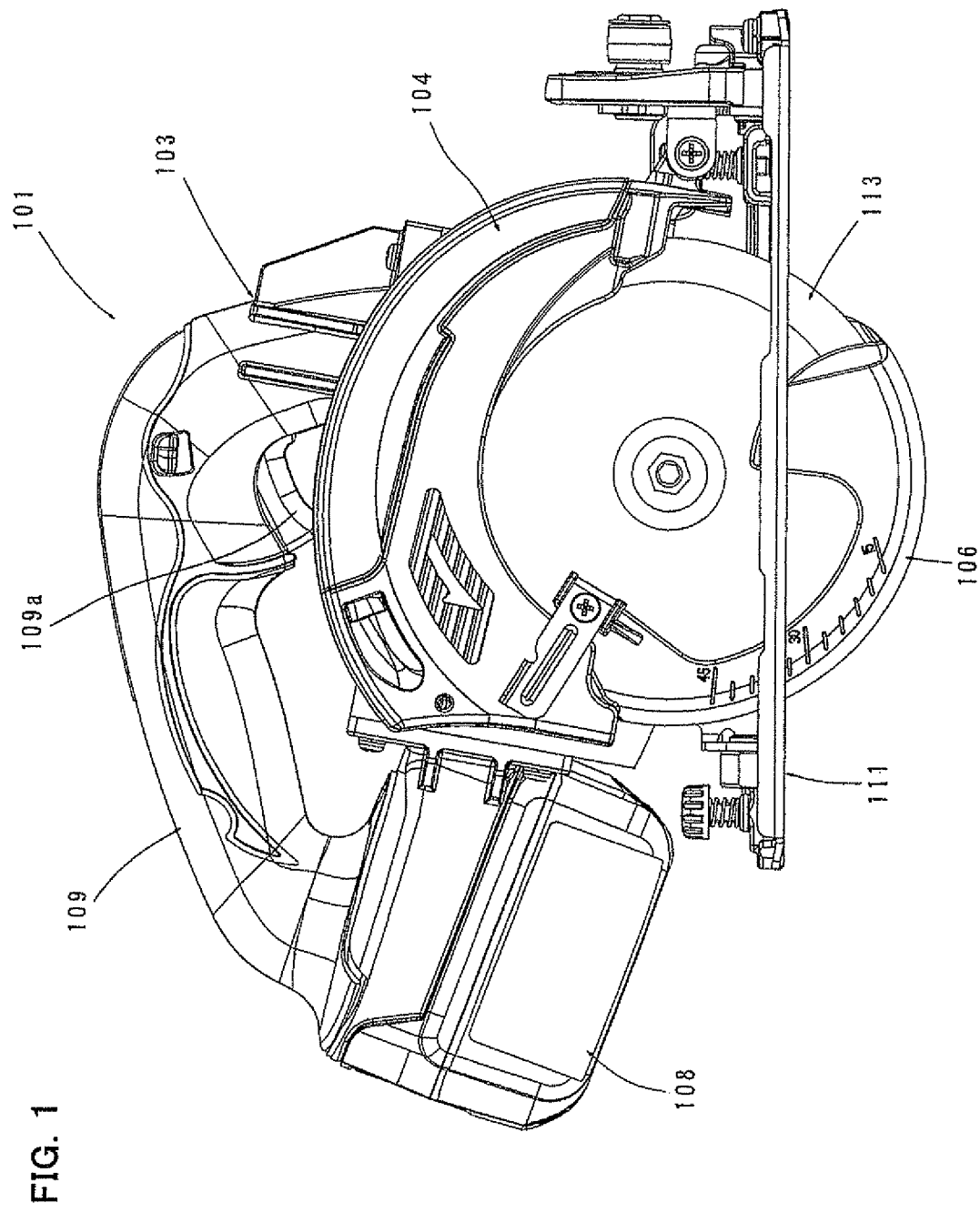
FIG. 1 is a side view showing an entire circular saw according to a first embodiment of the invention.
Figure 2:
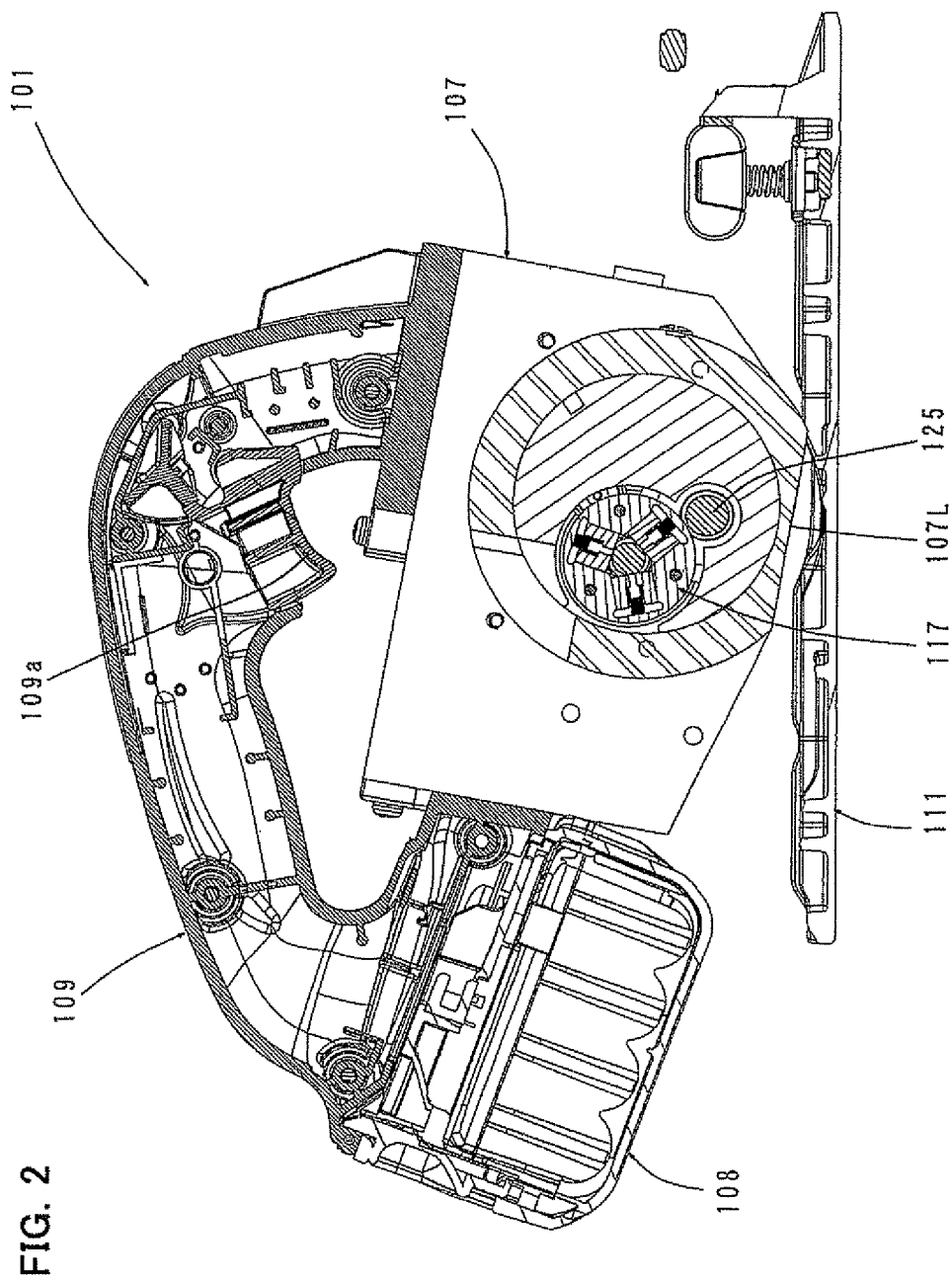
FIG. 2 is a sectional side view of the entire circular saw.
Figure 3:
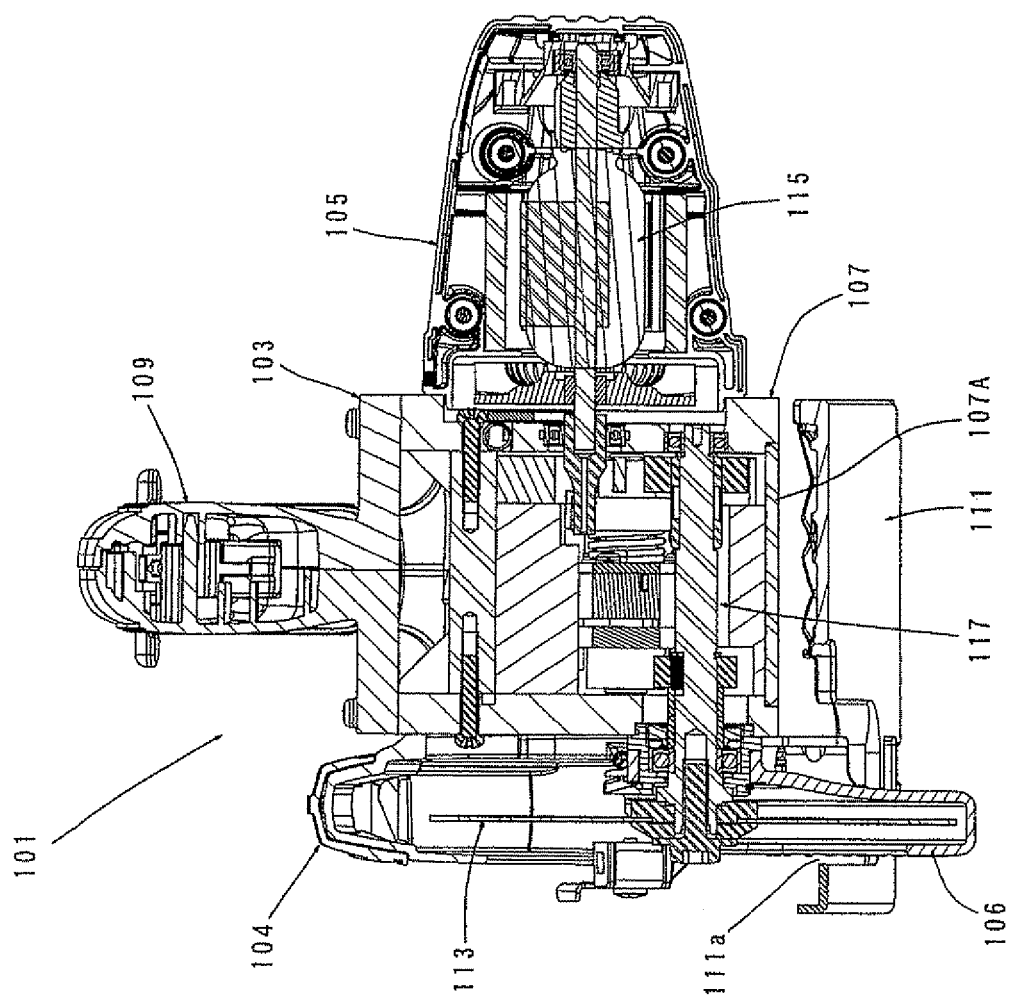
FIG. 3 is a sectional front view of the entire circular saw.

A first embodiment of the invention is now explained with reference to the drawings. A battery-powered circular saw (also referred to as a power tool) having a battery is now explained as a representative embodiment of the "circular saw" according to the invention. FIG. 1 is a side view showing an entire circular saw 101 according to this embodiment. FIG. 2 is a sectional side view of the entire circular saw 101. FIG. 3 is a sectional front view of the entire circular saw 101. As shown in FIGS. 1 to 3, the circular saw 101 according to this embodiment includes a base 111 which can be placed on a workpiece (not shown) and moved in a cutting direction, and a circular saw body 103 disposed above the base 111.

The circular saw body 103 mainly includes a blade case 104 that covers substantially an upper half of a disc-like blade (saw blade) 113 which is rotated in a vertical plane, a motor housing 105 that houses a driving motor 115, a gear housing 107 that houses a speed change mechanism 117, and a handgrip 109 which is held by a user to operate the circular saw 101. The blade 113 is a saw blade that is rotationally driven to cut a workpiece and corresponds to the "tool bit" according to this invention. The driving motor 115 is a feature that corresponds to the "power source" according to this invention.

A safety cover 106 is rotatably attached to the blade case 104 and covers a lower half of the blade 113. A lower edge portion of the blade 113 including the safety cover 106 protrudes from the underside of the base 111 through an opening 111a (see FIG. 3) of the base 111. In cutting a workpiece, when the front end (the right end as viewed in FIG. 2) of the base 111 is placed on the workpiece and moved forward (rightward as viewed in FIGS. 1 and 2), the front end of the safety cover 106 is pushed by the workpiece, so that the safety cover 106 retracts and is housed within the blade case 104. The handgrip 109 is connected to an upper portion of the gear housing 107 and has a trigger 109a that is depressed by the user to drive the driving motor 115. The blade 113 is rotationally driven via the speed change mechanism 117 when the driving motor 115 is driven. The speed change mechanism 117 here is a mechanism that is disposed between the driving motor 115 and the blade 113 and varies the rotation speed of the blade 113, and is a feature that corresponds to the "speed change mechanism". Further, a battery 108 is detachably mounted to the end of the handgrip 109. The driving motor 105 in this embodiment is a rare earth motor with a brake. The battery 108 preferably comprises a lithium ion battery of 42 volts or less.

Figure 4:
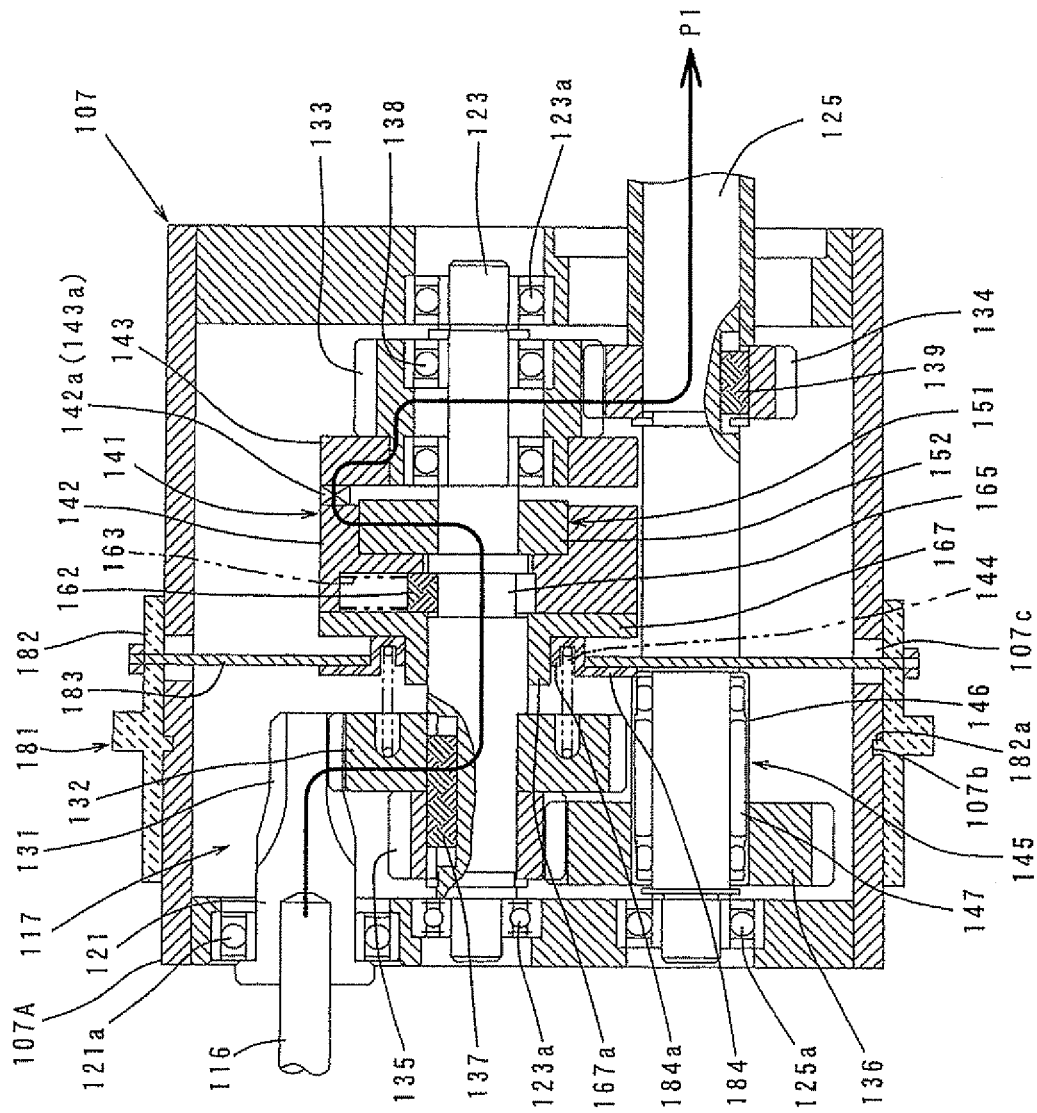
FIG. 4 is a developed sectional view of a parallel three-shaft type speed change mechanism in the state in which a power transmission path is switched to a high-speed low-torque path.
Figure 5:
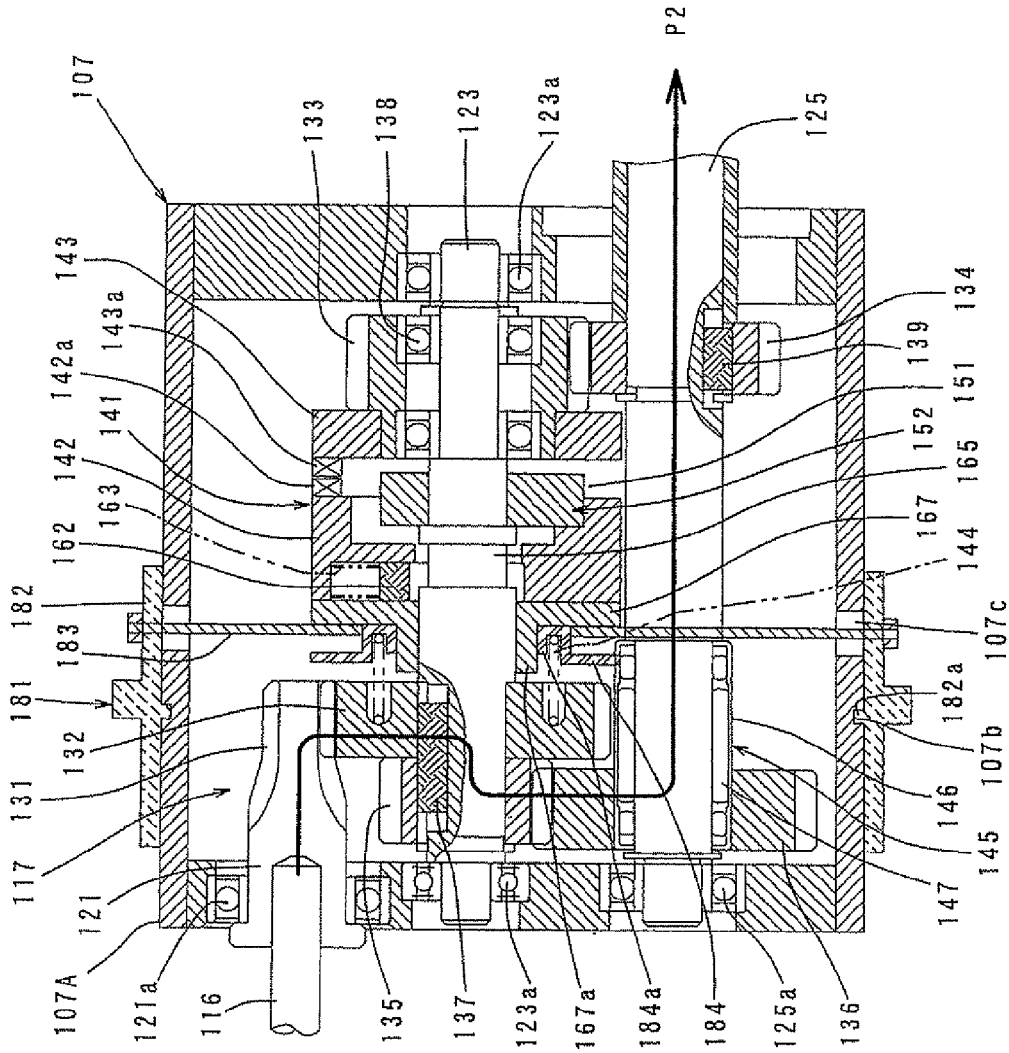
FIG. 5 is a developed sectional view of the parallel three-shaft type speed change mechanism in the state in which the power transmission path is switched to a low-speed high-torque path.

The speed change mechanism 117 is now explained with reference to FIGS. 4 and 5. The speed change mechanism 117 according to this embodiment is of a parallel three-shaft type having three shafts disposed parallel to each other, i.e. an input shaft 121 which is coaxially connected to a motor shaft 116 of the driving motor 115, an output shaft in the form of a blade mounting shaft 125 onto which the blade 113 is fitted, and an intermediate shaft 123 disposed between the input shaft 121 and the blade mounting shaft 125. The speed change mechanism 117 is of the two-stage switching type in which a power transmission path can be automatically switched between a high-speed low-torque path and a low-speed high-torque path according to the magnitude of load applied to the blade 113. The intermediate shaft 123, the blade mounting shaft (output shaft) 125 and the input shaft 121 here are features that correspond to the "first rotating shaft", the "second rotating shaft" and the "input shaft", respectively, according to this invention. FIGS. 4 and 5 are developed sectional views of the parallel three-shaft type speed change mechanism 117. FIG. 4 shows the state in which the power transmission path is switched to the high-speed low-torque path, and FIG. 5 shows the state in which the power transmission path is switched to the low-speed high-torque path. In the following description, the blade mounting shaft 125 is referred to as the output shaft.

The speed change mechanism 117 includes a first power transmission path P1 through which torque of the input shaft 121 is transmitted from a pinion gear 131 to the output shaft 125 via a first intermediate gear 132, the intermediate shaft 123, a second intermediate gear 133 and a first driven gear 134, and a second power transmission path P2 through which torque of the input shaft 121 is transmitted from the pinion gear 131 to the output shaft 125 via the first intermediate gear 132, the intermediate shaft 123, a third intermediate gear 135 and a second driven gear 136. The gear ratio (speed reduction ratio) between the second intermediate gear 133 and the first driven gear 134 is designed to be lower than the gear ratio (speed reduction ratio) between the third intermediate gear 135 and the second driven gear 136. Therefore, the first power transmission path P1 forms a high-speed low-torque power transmission path, and the second power transmission path P2 forms a low-speed high-torque power transmission path. The first power transmission path P1 and the second power transmission path P2 here are features that correspond to the "first power transmission path" and the "second power transmission path", respectively, according to this invention. The second intermediate gear 133 and the first driven gear 134 form the "first gear train" according to the invention, and the third intermediate gear 135 and the second driven gear 136 form the "second gear train" according to the invention.

The input shaft 121, the intermediate shaft 123 and the output shaft 125 in the speed change mechanism 117 are rotatably supported by the gear housing 107 via bearings 121a, 123a, 125a, respectively. A drive gear in the form of the pinion gear 131 is integrally formed on the input shaft 121. The first intermediate gear 132 and the third intermediate gear 135 are disposed side by side on one end region (on the driving motor 115 side or the left side as viewed in the drawing) of the intermediate shaft 123 and integrated with the intermediate shaft 123 via a common key 137. The first intermediate gear 132 is normally engaged with the pinion gear 131, and the third intermediate gear 135 is normally engaged with the second driven gear 136 provided on one end region of the output shaft 125. The second intermediate gear 133 is mounted for relative rotation on the other end region (on the blade 113 side or the right side as viewed in the drawing) of the output shaft 125 via a bearing 138 and normally engaged with the first driven gear 134. The first driven gear 134 is disposed on the other end region of the output shaft 125 and integrated with the output shaft 125 via a key 139.

In the circular saw 101 according to this embodiment, in an initial stage of a cutting operation of cutting a workpiece by the blade 113 in which the load applied to the blade 113 is relatively small, the output shaft 125 or the blade 113 is rotationally driven via the high-speed low-torque first power transmission path P1. Thereafter, when the load applied to the blade 113 reaches a predetermined value as the cutting operation proceeds, it is automatically switched to the low-speed high-torque second power transmission path P2. Such switching from the first power transmission path P1 to the second power transmission path P2 is realized by providing a sliding engagement clutch 141 on the intermediate shaft 123 and a one-way clutch 145 on the output shaft 125. The sliding engagement clutch 141 here is a feature that corresponds to the "sliding engagement clutch" according to this invention. Further, the sliding engagement clutch 141 and the one-way clutch 145 form the "first and second clutches", respectively, according to this invention. Specific settings for switching from the first power transmission path P1 to the second power transmission path P2 are described below with reference to FIGS. 26 to 28.

Figure 6:
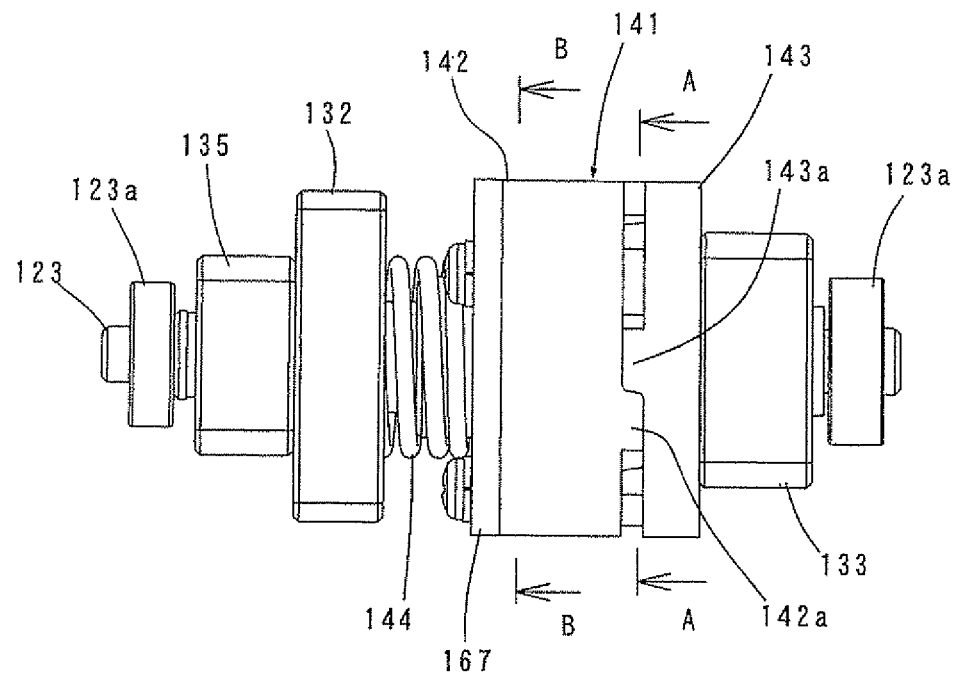
FIG. 6 is an external view of a sliding engagement clutch.
Figure 7:
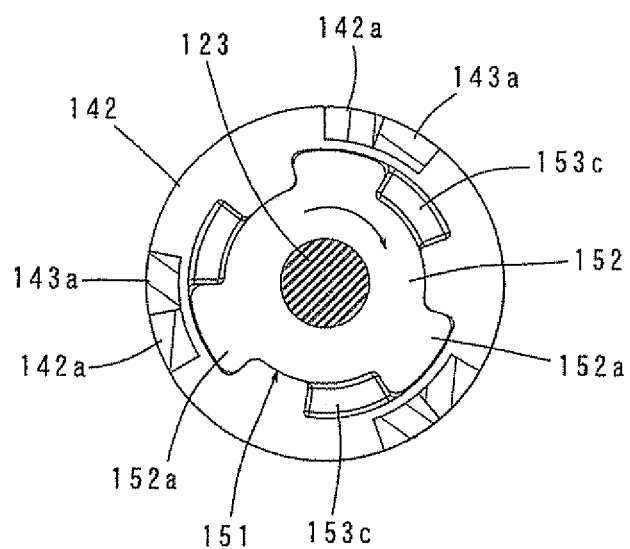
FIG. 7 is a sectional view taken along line A-A in FIG. 6.
Figure 8:
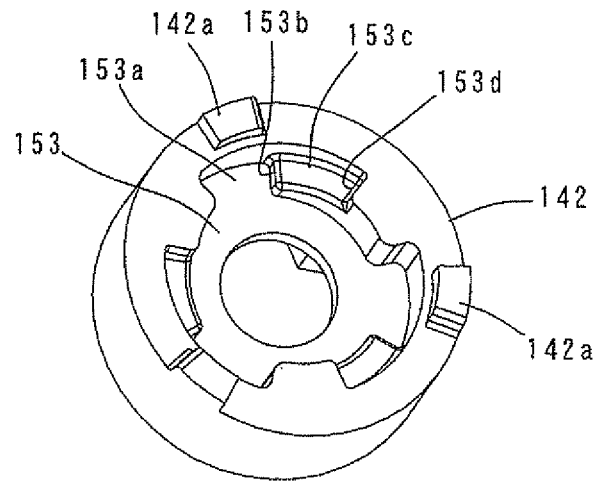
FIG. 8 is a perspective view showing a drive side clutch member in the sliding engagement clutch.
Figure 9:
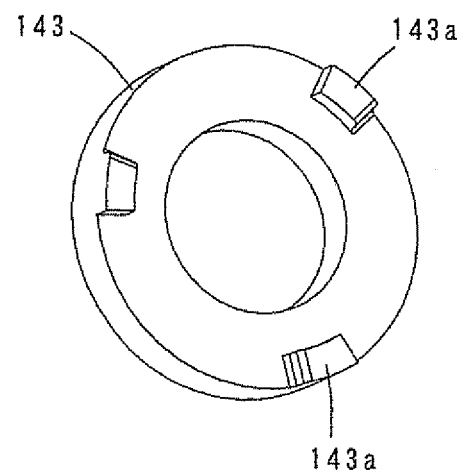
FIG. 9 is a perspective view showing a driven side clutch member in the sliding engagement clutch.
Figure 10:
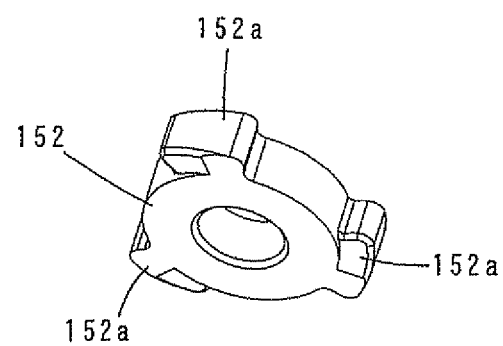
FIG. 10 is a perspective view showing a torque ring in the sliding engagement clutch.

The construction of the sliding engagement clutch 141 is shown in FIGS. 6 to 10 as well as FIGS. 4 and 5. FIG. 6 is an external view of the sliding engagement clutch 141 and FIG. 7 is a sectional view taken along line A-A in FIG. 6. FIG. 8 shows a drive side clutch member 142, FIG. 9 shows a driven side clutch member 143, and FIG. 10 shows a torque ring 152. As shown in FIG. 6, the sliding engagement clutch 141 mainly includes the drive side clutch member 142 and the driven side clutch member 143 which face each other in the axial direction of the intermediate shaft 123, and a clutch spring 144 which presses and biases the drive side clutch member 142 toward the driven side clutch member 143. As shown in FIGS. 8 and 9, the drive side clutch member 142 and the driven side clutch member 143 have a plurality of (for example, three) generally trapezoidal cams 142a, 143a, respectively, in the circumferential direction on the respective sides facing each other. Torque is transmitted when the cams 142a, 143a are engaged with each other (see FIGS. 4 and 6), while the torque transmission is interrupted when the cams 142a, 143a are disengaged from each other (see FIG. 5).

The drive side clutch member 142 is loosely fitted onto the intermediate shaft 123. Specifically, the drive side clutch member 142 is mounted onto the intermediate shaft 123 such that it can slide with respect to the intermediate shaft 123 in the circumferential direction and the axial direction. The drive side clutch member 142 is rotationally driven via a torque transmission member in the form of the torque ring 152 which is press-fitted onto the intermediate shaft 123. As shown in FIG. 10, the torque ring 152 has a plurality of (three) torque transmission parts in the form of protrusions 152a which protrude radially outward and are evenly spaced in the circumferential direction. A housing space 153 is formed in a side of the drive side clutch member 142 on which the cams 142a are formed, and has a shape generally corresponding to the contour of the torque ring 152. The torque ring 152 is housed in the housing space 153 such that the torque ring 152 cannot move in the circumferential direction with respect to the drive side clutch member 142. Each of the protrusions 152a of the torque ring 152 is engaged with an engagement recess 153a (see FIG. 8) of the housing space 153. Therefore, when the torque ring 152 is rotated together with the intermediate shaft 123, the protrusion 152a pushes a radial wall surface of the drive side clutch member 142 which faces the engagement recess 153a, or a torque transmission surface 153b, in the circumferential direction, so that the drive side clutch member 142 rotates together with the torque ring 152.

Further, the driven side clutch member 143 is integrated with the second intermediate gear 133.

The drive side clutch member 142 is biased toward a power transmission position in which the cams 142a are engaged with the cams 143a of the driven side clutch member 143, by an elastic member in the form of a clutch spring 144 comprising a compression coil spring. The clutch spring 144 is elastically disposed between the drive side clutch member 142 and the first intermediate gear 132.

Figure 11:
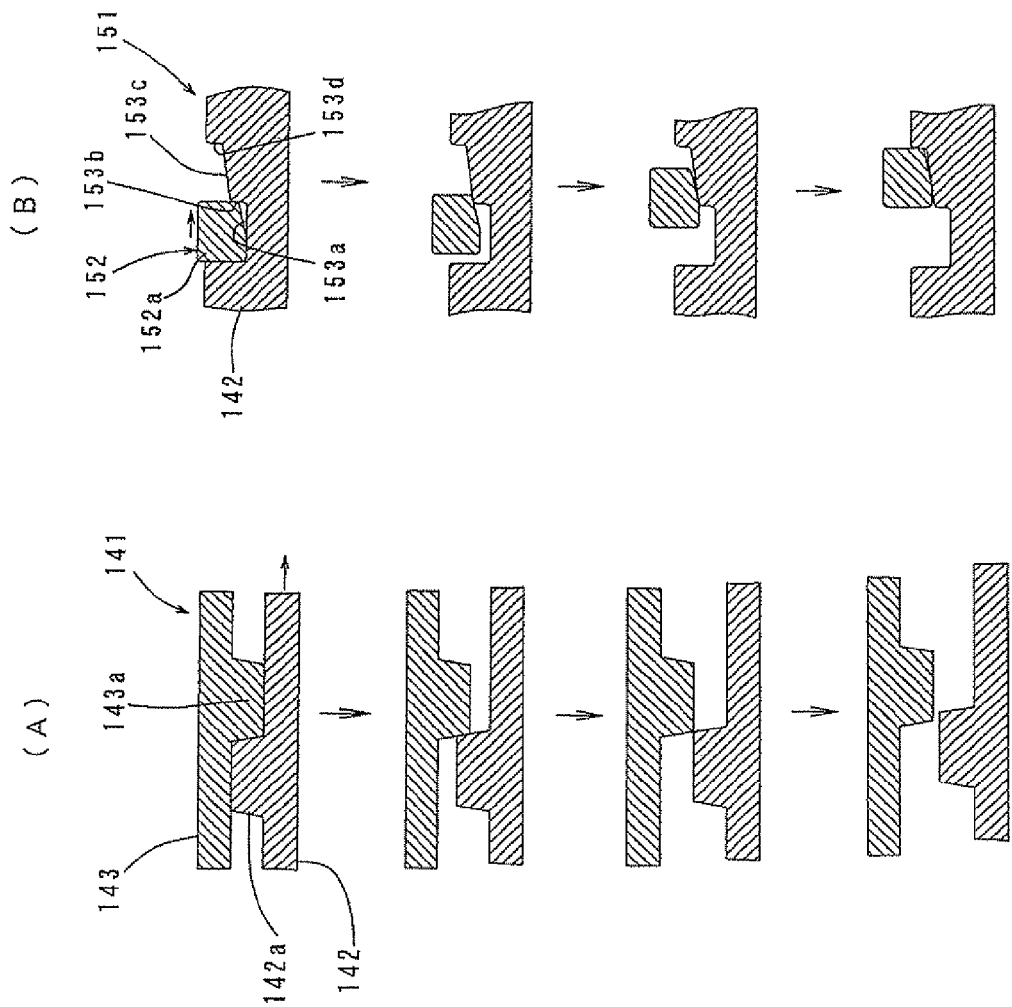

In the state in which the blade 113 is rotationally driven by using the first power transmission path P1, when the blade 113 is subjected to a load exceeding a predetermined value which overcomes the biasing force of the clutch spring 144, the drive side clutch member 142 is moved (retracted) away from the driven side clutch member 143 by components of a force acting upon inclined surfaces of the cams 142a, 143a in the longitudinal direction. Specifically, the drive side clutch member 142 is moved to a power release position and thus brought into a power transmission interrupted state by disengagement of the cams 142a, 143a. FIG. 11 (A) shows the sliding engagement clutch 141 shifting from the power transmission state to the power transmission interrupted state. When the sliding engagement clutch 141 is shifted to the power transmission interrupted state, the one-way clutch 145 is activated, so that the power transmission path is switched from the high-speed low-torque first power transmission path P1 to the low-speed high-torque second power transmission path P2.

Figure 15:
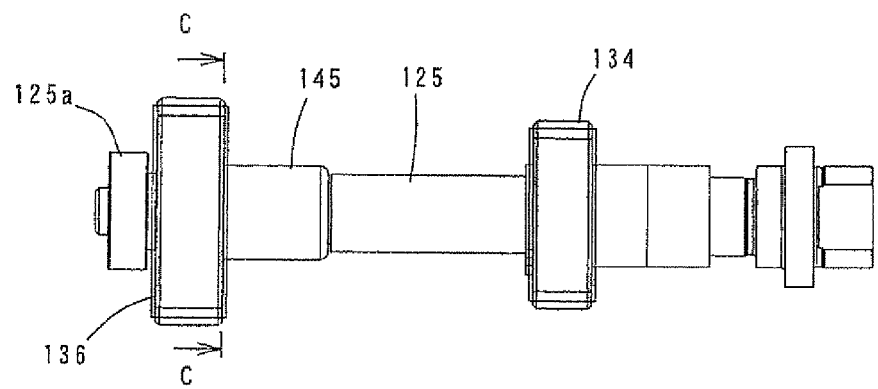
FIG. 15 is a side view showing parts provided on an output shaft.
Figure 16:
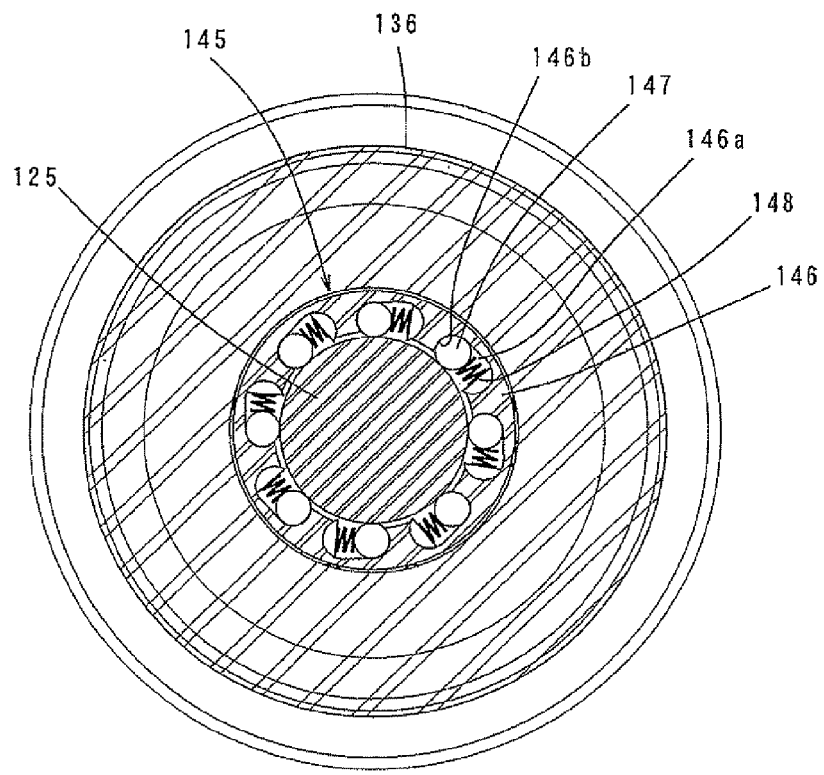
FIG. 16 is a sectional view taken along line C-C in FIG. 15.

The one-way clutch 145 is now explained. The construction of the one-way clutch 145 is shown in FIGS. 15 and 16. FIG. 15 is a side view showing parts provided on the output shaft 125, and FIG. 16 is a sectional view taken along line C-C in FIG. 15. The one-way clutch 145 mainly includes an outer ring 146 that rotates together with the second driven gear 136, a plurality of needle rollers 147 and springs 148 which are disposed between the outer ring 146 and the output shaft 125. The needle rollers 147 are rotatably disposed in cam grooves 146a which are formed in the outer ring 146 at predetermined intervals in the circumferential direction, and biased by the springs 148 toward the position of engagement with cam faces 146b.

Therefore, when the outer ring 146 is rotated clockwise as viewed in FIG. 16 together with the first driven gear 134 with respect to the output shaft 125, the needle rollers 147 are engaged between the associated cam faces 146b and the output shaft 125 by the biasing force of the associated springs 148, and drive the output shaft 125 by a wedging action. This state is shown in FIG. 16. When the output shaft 125 rotates at higher speed than the outer ring 146, the outer ring 146 rotates counterclockwise as viewed in the drawing with respect to the output shaft 125. Therefore, the needle rollers 147 are disengaged from the associated cam faces 146b, so that the outer ring 146 idles with respect to the output shaft 125. Specifically, when the sliding engagement clutch 141 is in the power transmission state, the outer ring 146 rotates counterclockwise as viewed in the drawing with respect to the output shaft 125, so that the one-way clutch 145 idles and does not transmit power.

With the speed change mechanism 117 constructed as described above, when the driving motor 115 is stopped, the sliding engagement clutch 141 is held such that the drive side clutch member 142 is biased toward the driven side clutch member 143 by the biasing force of the clutch spring 144. Specifically, it is held in the power transmission state in which the cams 142a, 143a of the clutch members 142, 143 are engaged with each other. In this state, when the driving motor 115 is driven to perform a cutting operation on a workpiece, the torque of the driving motor 115 is transmitted to the output shaft 125 via the first power transmission path P1. Specifically, the blade 113 is rotated at high speed and low torque via the pinion gear 131, the first intermediate gear 132, the intermediate shaft 123, the sliding engagement clutch 141, the second intermediate gear 133, the first driven gear 134 and the output shaft 125.

At this time, the outer ring 146 of the one-way clutch 145 is also rotated via the intermediate shaft 123, the third intermediate gear 135 and the second driven gear 136. As described above, however, the outer ring 146 idles because the output shaft 125 rotates at higher speed than the outer ring 146.

As described above, a cutting operation on a workpiece by the blade 113 starts at high speed and low torque via the first power transmission path P1. Thereafter, when the load applied to the blade 113 reaches a switching set value defined by the clutch spring 144 of the sliding engagement clutch 141, the sliding engagement clutch 141 is shifted to the power transmission interrupted state. Specifically, as shown in FIG. 11(A), the drive side clutch member 142 is moved away from the driven side clutch member 143 against the biasing force of the clutch spring 144 by components of the force acting upon the drive side clutch member 142 in the longitudinal direction via the cam faces (inclined surfaces) of the cams 142a, 143a, so that the cams 142a, 143a are disengaged from each other. Thus, the sliding engagement clutch 141 is shifted to the power transmission interrupted state, and when the speed of rotation of the output shaft 125 is reduced to below the speed of rotation of the outer ring 146 of the one-way clutch 145, the needle rollers 147 are engaged between the associated cam faces 146b and the output shaft 125 by the biasing force of the associated springs 148, and drive the output shaft 125 by a wedging action. As a result, the transmission path of the torque of the driving motor 115 is switched from the first power transmission path P1 to the second power transmission path P2, and the blade 113 is rotated at low speed and high torque which are determined by the gear ratio between the pinion gear 131 and the first intermediate gear 132 and the gear ratio between the third intermediate gear 135 and the second driven gear 136.

As described above, according to this embodiment, when the load applied to the blade 113 is low, the cutting operation can be performed on the workpiece at high speed and low torque by using the first power transmission path P1 having a low gear ratio. On the other hand, when the load applied to the blade 113 is high, the cutting operation can be performed on the workpiece at low speed and high torque by using the second power transmission path P2 having a high gear ratio.

With such a construction in which the torque transmission path is automatically switched from the high-speed low-torque first power transmission path P1 to the low-speed high-torque second power transmission path P2 according to the load applied to the blade 113, compared with a circular saw having no speed change mechanism, the driving motor 115 can be prevented from being burnt, and the work rate of cutting on a single charge of the battery 108 can be improved.

Particularly, in this embodiment, switching from the first power transmission path P1 to the second power transmission path P2 can be made in the state in which the gears in the gear trains forming the speed change mechanism 117 are held engaged with each other, or in which the positions of the gears are fixed. Therefore, speed changing operation can be performed with increased smoothness.

Further, according to this embodiment, with the construction in which the sliding engagement clutch 141 is provided on the intermediate shaft 123 and the one-way clutch 145 is provided on the output shaft 125, switching of the transmission path from the first power transmission path P1 to the second power transmission path P2 can be achieved simply by controlling the operation of the sliding engagement clutch 141. Thus, the rational speed change mechanism 117 can be obtained.

Further, in this embodiment, by the arrangement of the sliding engagement clutch 141 on the intermediate shaft 123 which rotates at higher speed and lower torque than the output shaft 125, the load on the sliding engagement clutch 141 can be reduced. Therefore, such a construction is effective in protecting the clutch or improving the durability of the clutch. Further, in terms of the arrangement of the shafts with respect to the gear housing 107, the intermediate shaft 123 is disposed toward the center of the gear housing 107. Therefore, by disposing the sliding engagement clutch 141 which is larger in the radial direction than the one-way clutch 145, on the intermediate shaft 123, the gear housing 107 can be prevented from increasing in size.

The maximum cutting depth of the circular saw 101 (the amount of protrusion of the lower edge portion of the blade 113 from the underside of the base 111) is defined by contact of a maximum cutting depth control part formed on the gear housing 107 with a stopper on the base 111, which is not shown, when the user depresses the handgrip 109 downward from the state shown in FIG. 2 so that the circular saw body 103 is rotated on a pivot (not shown) provided on the front end portion of the base 111. Therefore, for example, if the sliding engagement clutch 141 having a large outside diameter is provided on the output shaft 125, the distance from the center of the output shaft 125 to a lower end surface 107L of the gear housing 107 is increased, which affects the maximum cutting ability. Thus, the maximum cutting ability is degraded. According to this embodiment, however, by providing the sliding engagement clutch 141 on the intermediate shaft 123, the distance from the output shaft 125 to the lower end surface 107L of the gear housing 107 can be reduced, which does not affect the maximum cutting ability.

The one-way clutch 145 is arranged on the output shaft 125. The second driven gear 136 on the output shaft 125 on the speed reduced side has a larger diameter than the third intermediate gear 135 on the intermediate shaft 123. Therefore, by disposing the one-way clutch 145 between the output shaft 125 and the second driven gear 136, a mounting space for the one-way clutch 145 can be easily secured, so that the one-way clutch 145 can be easily mounted.

In a construction in which the sliding engagement clutch 141 is automatically shifted according to the load applied to the blade 113, if the load applied to the blade 113 fluctuates around the switching set value defined by the clutch spring 144, the sliding engagement clutch 141 is frequently shifted. Therefore, in order to solve such a problem, the speed change mechanism 117 according to this embodiment is provided with a latching mechanism 151 and a reset mechanism. Once the sliding engagement clutch 141 is shifted to a power transmission interrupted state, the shifted state is retained by the latching mechanism 151. The reset mechanism serves to return it to the initial state or power transmission state after stop of the cutting operation (when the driving motor 115 is stopped).

The latching mechanism 151 is now explained mainly with reference to FIGS. 7, 8, 10 and 11. When the drive side clutch member 142 of the sliding engagement clutch 141 is moved to the power transmission interrupted position, the latching mechanism 151 serves to retain the drive side clutch member 142 in the power transmission interrupted position, or particularly in the position in which the cams 142a of the drive side clutch member 142 are separated (opposed with a clearance) from the cams 143a of the driven side clutch member 143. The latching mechanism 151 mainly includes the above-described torque ring 152. The latching mechanism 151 here is a feature that corresponds to the "latching mechanism" according to this invention.

In the housing space 153 which is formed in the drive side clutch member 142 in order to house the torque ring 152, an inclined surface 153c inclined upward and forward is formed on the drive side clutch member 142 in a forward region (in the direction of rotation) of each of the engagement recesses 153a with which the protrusions 152a of the torque ring 152 are engaged. When the drive side clutch member 142 is moved from the power transmission position to the power transmission interrupted position and thus brought into the power transmission interrupted state, the torque ring 152 is moved out of the housing space 153 and each of the protrusions 152a is moved onto the associated inclined surface 153c. Thus, the cams 142a of the drive side clutch member 142 are separated from the cams 143a of the driven side clutch member 143. This process is shown in FIG. 11. FIG. 11(A) shows the clutch movement, and FIG. 11(B) shows the movement of the torque ring 152 provided as the latching member. For smooth movement of the protrusion 152a of the torque ring 152 onto the inclined surface 153c, the surface of the protrusion 152a which faces the associated inclined surface 153c is configured as an inclined surface or arcuate curved surface.

As shown in FIG. 11 on the top, in the engaged state of the cams 142a, 143a in which the drive side clutch member 142 is placed in the power transmission position, as described above, the protrusion 152a of the torque ring 152 is engaged with the associated torque transmission surface 153b in the engagement recess 153a and held in the torque transmission state. In such a state, when the load applied to the blade 113 exceeds a predetermined value defined by the clutch spring 144 and the drive side clutch member 142 retracts toward the power transmission interrupted position, the torque ring 152 fixed on the intermediate shaft 123 moves in the longitudinal direction, or in a direction of movement out of the housing space 153, with respect to the drive side clutch member 142. Thus, the protrusion 152a of the torque ring 152 is slipped out of the associated engagement recess 153a and disengaged from the associated torque transmission surface 153b. As a result, a difference is caused in the rotation speed between the torque ring 152 and the drive side clutch member 142 to which torque is no longer transmitted. Therefore, the torque ring 152 moves in the circumferential direction with respect to the drive side clutch member 142, and the protrusion 152a of the torque ring 152 climbs on the edge end of the inclined surface 153c (see the second from the top in FIG. 11). By this climbing movement of the protrusion 152a, the drive side clutch member 142 is pushed in the longitudinal direction. Specifically, the drive side clutch member 142 is acted upon by a force in a direction (longitudinal direction) in which the cams 142a are separated from the cams 143a of the driven side clutch member 143. Separation of the cams 142a, 143a is assisted by this force. As a result, the load applied to the cam faces of the cams 142a, 143a is lessened, so that wear of the cams 142a, 143a can be reduced, and thus fluctuations of the switching set value defined by the clutch spring 144 can be minimized.

When the drive side clutch member 142 is further retracted and the cams 142a, 143a are disengaged from each other, the torque ring 152 further moves in the circumferential direction with respect to the drive side clutch member 142. Therefore, the protrusion 152a further climbs onto the inclined surface 153c. Specifically, assistance in separation of the cams 142a, 143a by this climbing movement is continued even after disengagement of the cams 142a, 143a. Therefore, the drive side clutch member 142 is further moved away from the driven side clutch member 143 so that a clearance is created in the longitudinal direction between the cams 142a, 143a. The protrusion 152a climbs on the inclined surface 153c and is engaged with a stopper surface 153d extending upright from the front end of the inclined surface 153c. Thereafter, the torque ring 152 and the drive side clutch member 142 rotate together. This state is shown in FIG. 11(B) on the bottom.

Specifically, when the drive side clutch member 142 is shifted from the power transmission state to the power transmission interrupted state, the torque ring 152 further retracts the drive side clutch member 142 past the power transmission interrupted position in which the cam 142a of the drive side clutch member 142 is disengaged from the cam 143a of the driven side clutch member 143, or to an isolated position in which a predetermined clearance is secured in the longitudinal direction between the cams 142a, 143a, and retains it in this isolated position. Thus, once the sliding engagement clutch 141 is shifted to the power transmission interrupted state, it retains the shifted state regardless of the load applied to the blade 113. Therefore, even if the load applied to the blade 113 fluctuates around the switching set value defined by the clutch spring 144, stable cutting operation can be realized at low speed and high torque via the second power transmission path P2. Further, with the construction in which the drive side clutch member 142 is moved to the isolated position and held in the isolated position so that a certain clearance is secured in the longitudinal direction between the cams 142a, 143a, a reliable power transmission interrupted state can be obtained, and noise and vibration can be prevented from being caused by contact between the cams 142a, 143a.

When the driving motor 115 is stopped after completion of the cutting operation, a brake of the driving motor 115 is activated. Then, the rotation speed of the intermediate shaft 123 is reduced, so that a difference is caused in the rotation speed between the torque ring 152 which rotates together with the intermediate shaft 123 and the drive side clutch member 142 which tends to maintain its rotation speed by inertial torque. Thus, the two members 152, 142 rotate with respect to each other in the circumferential direction, or particularly in the direction in which the protrusion 152a of the torque ring 152 climbs down the inclined surface 153c of the drive side clutch member 142. Therefore, the protrusion 152a is engaged in the engagement recess 153a of the housing space 153. Specifically, the torque ring 152 is returned (reset) to its initial position, so that the power transmission interrupted state held by the sliding engagement clutch 141 is automatically released. Thus, the reset mechanism is formed by utilizing the brake of the driving motor 115 and the inertia of the drive side clutch member 142. The reset mechanism here is a feature that corresponds to the "reset mechanism" according to this invention. When the power transmission interrupted state held by the torque ring 152 is released, the drive side clutch member 142 is moved to the power transmission position by the biasing force of the clutch spring 144, so that it can be made ready for the next cutting operation.

Further, in the case of the speed change mechanism 117 according to this embodiment, when the blade 113 has a large mass and great inertia, at the time of startup of the driving motor 115, the sliding engagement clutch 141 may malfunction, or particularly shift from the power transmission interrupted state and cause speed change. In order to solve such a problem, the speed change mechanism 117 according to this embodiment is provided with a speed change preventing mechanism 161 for preventing speed change at the time of startup of the motor. The speed change preventing mechanism 161 here is a feature that corresponds to the "switching preventing mechanism" according to this invention.

Figure 12:
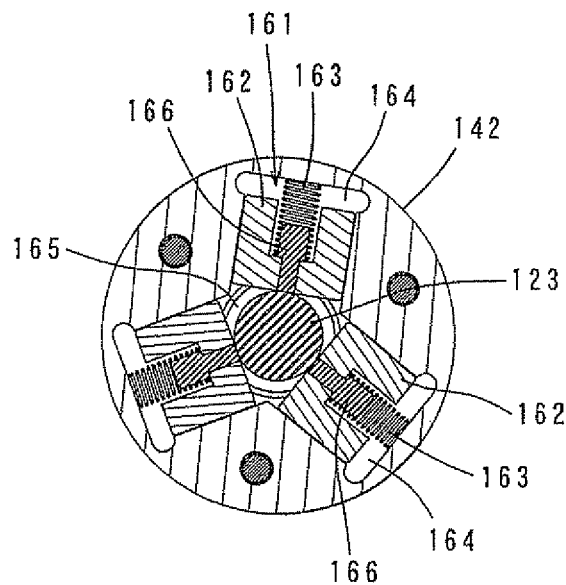
FIG. 12 is a sectional view taken along line B-B in FIG. 6.
Figure 13:
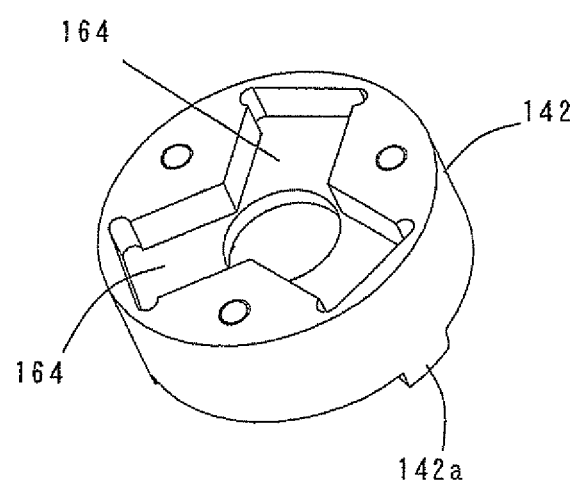
FIG. 13 is a perspective view of the drive side clutch member as viewed from a clutch spring mounting side.
Figure 14:
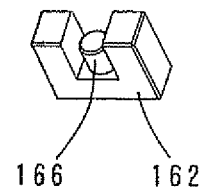
FIG. 14 is a perspective view of a stopper.

The speed change preventing mechanism 161 is now explained mainly with reference to FIGS. 12 to 14. FIG. 12 is a sectional view taken along line B-B in FIG. 6. FIG. 13 is a perspective view of the drive side clutch member 142 as viewed from the clutch spring mounting side. FIG. 14 is a perspective view of a stopper 162. The speed change preventing mechanism 161 according to this embodiment mainly includes a plurality of (for example, three) stoppers 162 and elastic members in the form of compression coil springs 163 which are radially arranged in the drive side clutch member 142.

Stopper housing recesses 164 are formed on the clutch spring mounting side (the side opposite from the cam 142a side) of the drive side clutch member 142 and arranged equiangularly in the circumferential direction. The stoppers 162 and the compression coil springs 163 are disposed within the stopper housing recesses 164 and can move in the radial direction. A radially inner end of each of the stoppers 162 faces the outer circumferential surface of the intermediate shaft 123, and the stopper 162 is pressed and biased toward the intermediate shaft 123 by the associated compression coil spring 163. An annular groove 165 is formed in the circumferential direction in a region of the outer circumferential surface of the intermediate shaft 123 which faces the stoppers 162. When the drive side clutch member 142 is placed in the power transmission position, the radially inner end of each of the stoppers 162 enters the annular groove 165 in the outer circumferential surface of the intermediate shaft 123 from the radial direction and is elastically engaged therewith, so that the drive side clutch member 142 is held in the power transmission position. This state is shown in FIGS. 12 and 4.

Movement of each of the compression coil springs 163 is stabilized by a guide pin 166 provided in each of the stoppers 162. Further, as shown in FIGS. 4 and 5, a disc-like cover 167 is mounted on the side of the drive side clutch member 142 in order to cover the stoppers 162 and the compression coil springs 163 disposed within the stopper housing recesses 164. The cover 167 is acted upon by the biasing force of the clutch spring 144.

The speed change preventing mechanism 161 according to this embodiment is constructed as described above. When the driving motor 115 is in the stopped state, the sliding engagement clutch 141 is in the power transmission state. Thus, the stoppers 162 which are biased radially inward by the compression coil springs 163 are held in engagement with the annular groove 165 of the intermediate shaft 123. Therefore, at the time of startup of the driving motor 115, the stoppers 162 held in engagement with the annular groove 165 of the intermediate shaft 123 prevent the drive side clutch member 142 from moving in the longitudinal direction, so that the drive side clutch member 142 is held in the power transmission position in which the cams 142a are engaged with the cams 143a of the driven side clutch member 143. In this manner, the sliding engagement clutch 141 can be prevented from malfunctioning at the time of startup of the motor.

When the driving motor 115 is started and the motor speed is increased, however, the stoppers 162 are moved outward against the biasing force of the compression coil spring 163 by centrifugal force acting upon the stoppers 162 which rotate together with the drive side clutch member 142, so that the stoppers 162 are disengaged from the annular groove 165 (see FIG. 5). Thus, the stoppers 162 can no longer prevent the drive side clutch member 142 from moving, so that the drive side clutch member 142 is allowed to shift from the power transmission state to the power transmission interrupted state according to the load applied to the blade 113.

Thus, by provision of the speed change preventing mechanism 161 according to this embodiment, in the electric circular saw 101 having the blade 113 with great inertia, the speed change mechanism 117 can be prevented from causing such a malfunction that it causes speed change, or particularly, switches from the first power transmission path P1 to the second power transmission path P2, by inertia of the blade 113 at the time of startup of the driving motor 115. Therefore, the advantage of the speed change mechanism 117 can be fully utilized. Further, the speed change preventing mechanism 161 is particularly effective not only in the circular saw 101 but in a power tool having a tool bit of a great mass, such as a grinder for grinding and polishing and a diamond core drill for drilling a relatively large-diameter hole.

Further, in this embodiment, the speed change preventing mechanism 161 is arranged on the intermediate shaft 123. Accordingly, the annular groove 165 is formed in the intermediate shaft 123 which is subjected to lower torque than the output shaft 125. Therefore, even though the diameter of the shaft is reduced at the region of the groove, this construction is more effective in increasing the durability, compared with a construction in which the speed change preventing mechanism 161 is arranged on the output shaft 125 which is subjected to higher torque.

Further, in this embodiment, the three stoppers 162 are equiangularly spaced apart from each other in the circumferential direction. With this arrangement, in the state in which the stoppers 162 are engaged with the annular groove 165, the force acting upon the drive side clutch member 142 in the longitudinal direction can be received by a plane including the center of rotation of the drive side clutch member 142. Therefore, the drive side clutch member 142 can be supported so as not to tilt with respect to the intermediate shaft 123, so that runout can be prevented.

Figure 17:
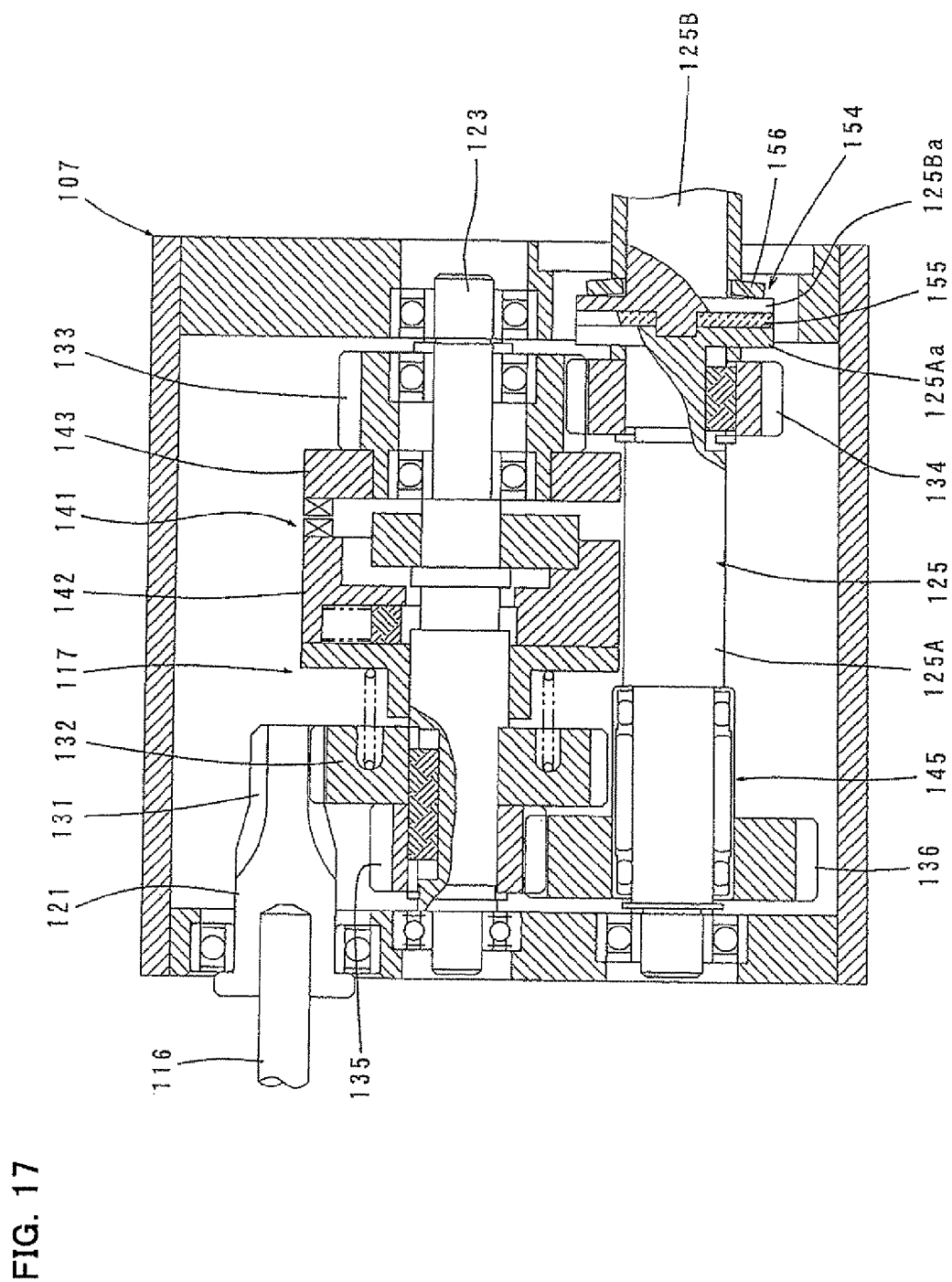
FIG. 17 is a developed sectional view showing a modification.

During cutting operation at low speed and high torque, excessive load may be applied to the blade 113. Therefore, as a measure against such occurrence, a torque limiter 154 is provided on the output shaft 125. FIG. 17 shows the torque limiter 154 mounted on the output shaft 125. The output shaft 125 is divided into two parts, or a proximal shaft part 125A on which the first and second driven gears 134, 136 are mounted, and a distal shaft part 125B on which the blade 113 is mounted, and connected by the torque limiter 154 disposed at the division.

The proximal shaft part 125A and the distal shaft part 125B of the output shaft 125 are coaxially disposed via a circular projection and a circular recess which are loosely fitted together, and have their respective flanges 125Aa, 125Ba which face each other. The torque limiter 154 includes a friction plate 155 disposed between the flange 125Aa of the proximal shaft part 125A and the flange 125Ba of the distal shaft part 125B, and a leaf spring 156 which applies a biasing force in a direction that presses the flanges 125Aa, 125Ba against each other. The maximum transmission torque is defined by the leaf spring 156.

Thus, the maximum transmission torque is controlled by the torque limiter 154 on a final shaft in the form of the output shaft 125. Therefore, during cutting operation, when an excessive load is applied to the blade 113, the friction plate 155 slides with respect to the flanges 125Aa, 125Ba, so that it can cope with the excessive load.

The speed change mechanism 117 according to this embodiment has a mode switching mechanism 181 for switching (selecting) the speed change mode. The mode switching mechanism 181 is a feature that corresponds to the "mode switching mechanism" according to this invention. The mode switching mechanism 181 can switch according to the load applied to the blade 113 among automatic transmission mode in which the torque transmission path is automatically switched from the first power transmission path P1 to the second power transmission path P2, high speed mode in which the torque transmission path is fixed (limited) to the first power transmission path P1, and low speed mode in which the torque transmission path is fixed (limited) to the second power transmission path P2.

Figure 18:
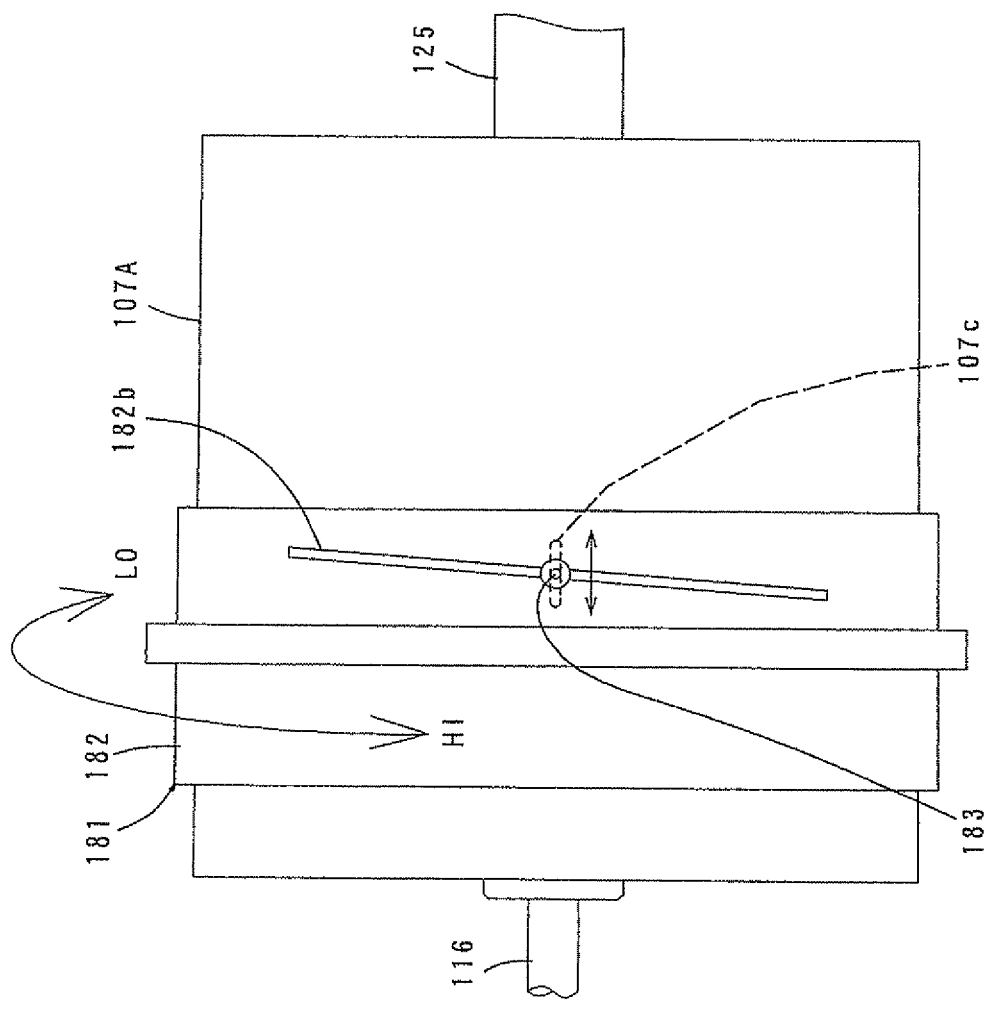
FIG. 18 is an external view showing the mode switching mechanism.
Figure 19:
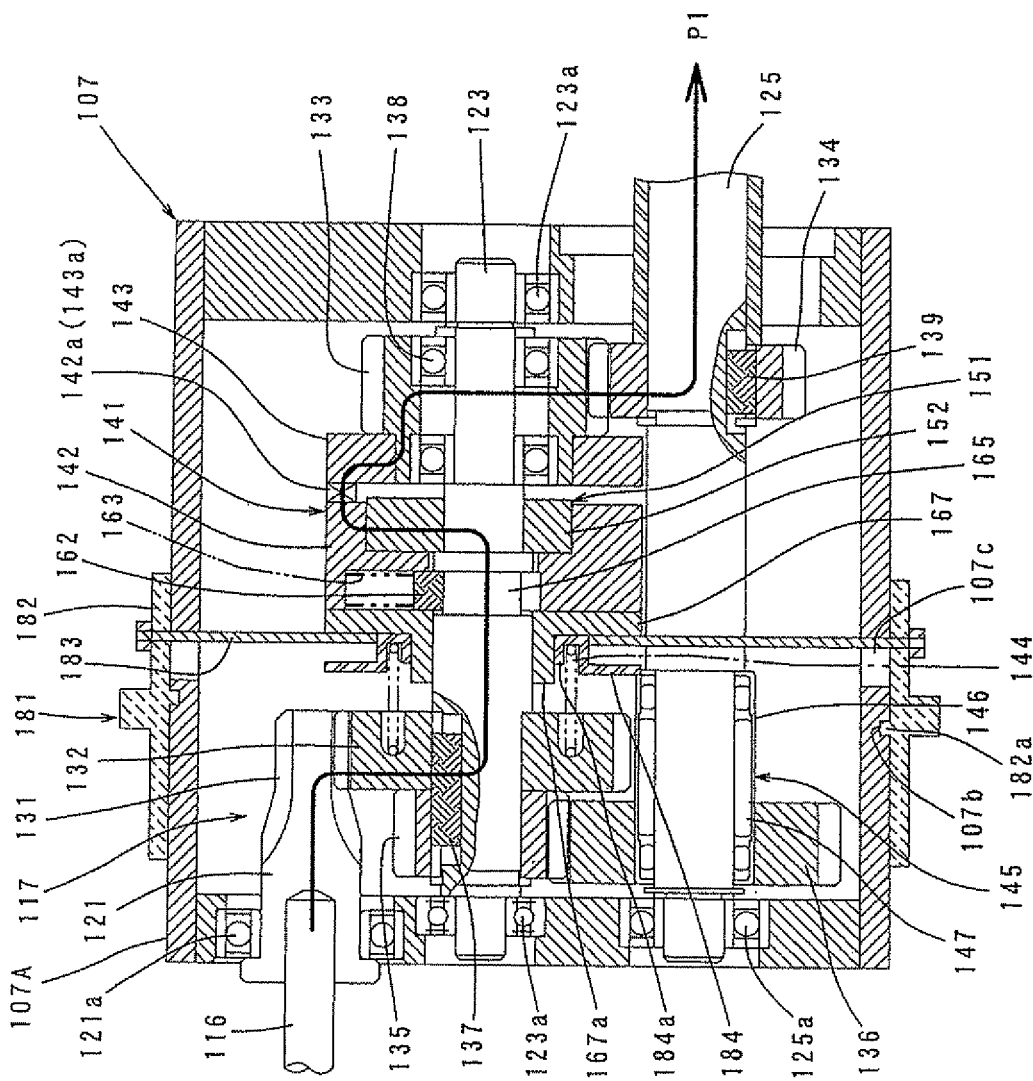
FIG. 19 is a developed sectional view of the mode switching mechanism fixed in the high speed mode.
Figure 20:
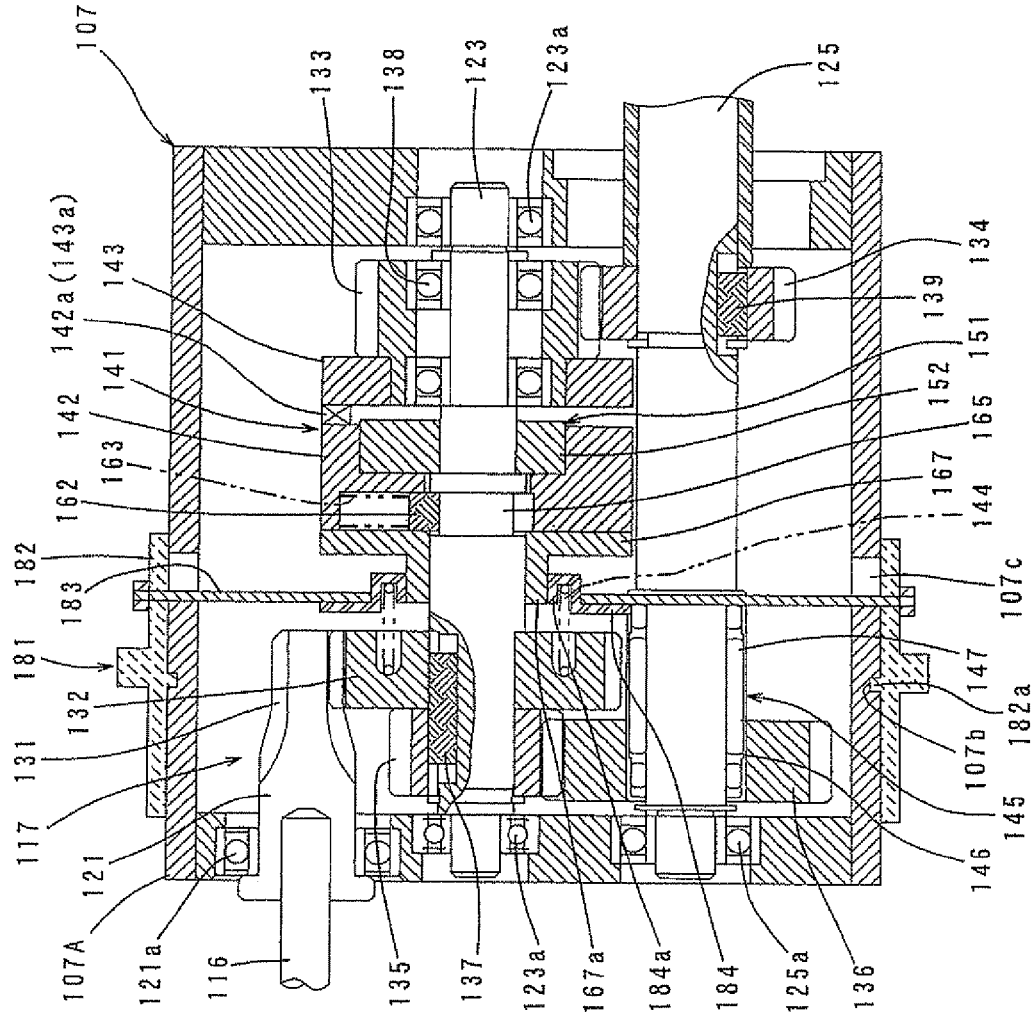
FIG. 20 is a developed sectional view of the mode switching mechanism fixed in the low speed mode, and showing the state before startup of the circular saw.
Figure 21:
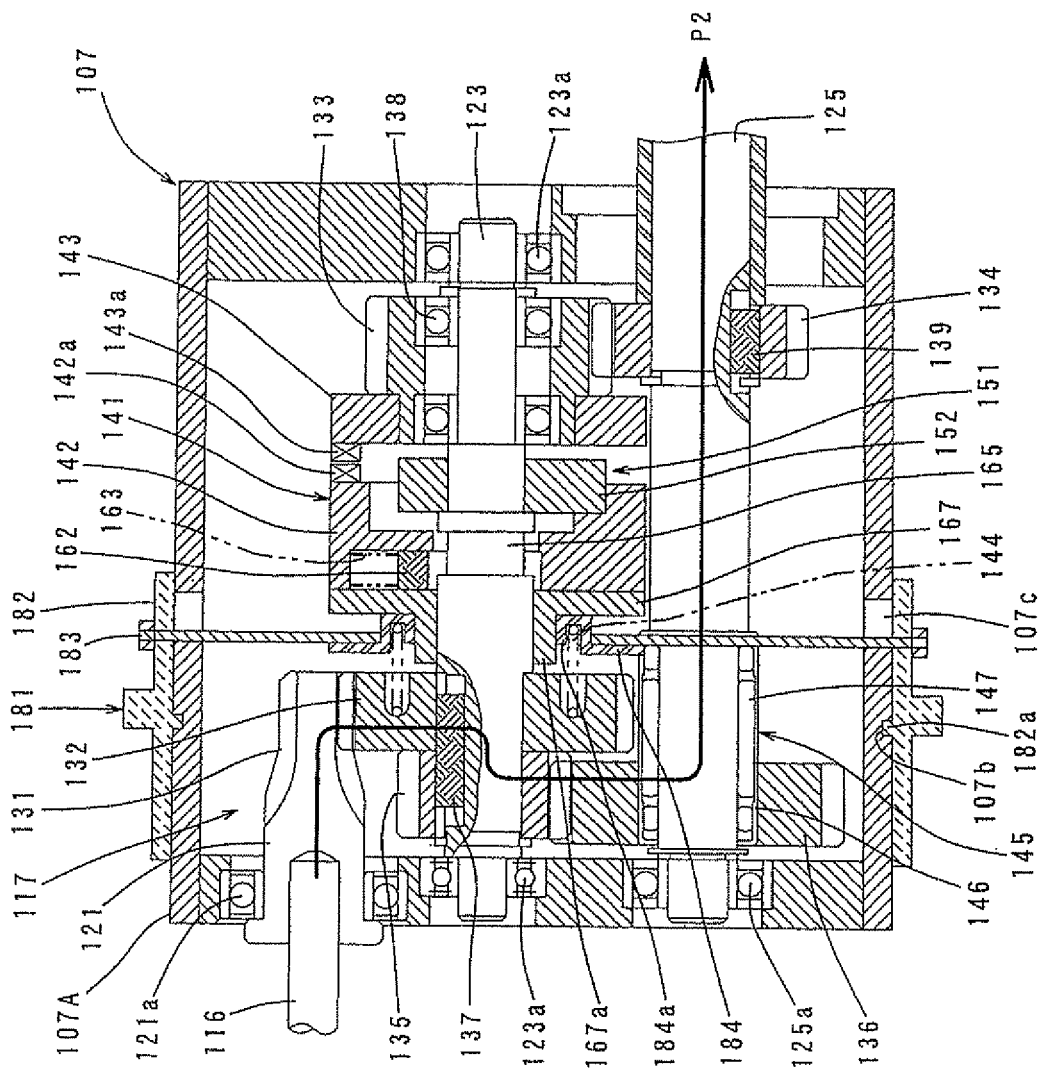
FIG. 21 is a developed sectional view of the mode switching mechanism fixed in the low speed mode, and showing the state after startup of the circular saw.

The mode switching mechanism 181 is now described mainly with reference to FIGS. 4, 5 and 18 to 21. FIG. 18 is an external view showing the mode switching mechanism 181, and FIGS. 19 to 21 are developed sectional views thereof. The gear housing 107 has a generally cylindrical inner housing 107A, and the above-described speed change mechanism 117 is housed within the inner housing 107A (see FIGS. 2 and 3). The inner housing 107A is constructed such that its longitudinal direction is parallel to the axial direction of the intermediate shaft 123 in the speed change mechanism 117 and thus to the longitudinal direction of the sliding engagement clutch 141. The mode switching mechanism 181 is mounted to the inner housing 107A.

The mode switching mechanism 181 is substantially designed such that the sliding engagement clutch 141 can be shifted among automatic transmission mode in which it is automatically shifted between the power transmission state and the power transmission interrupted state according to the load applied to the blade 113, high speed mode in which it is fixed in the power transmission state regardless of the magnitude of the load, and low speed mode in which it is fixed in the power transmission interrupted state regardless of the magnitude of the load. The mode switching mechanism 181 mainly includes a mode switching sleeve 182 which is fitted onto the inner housing 107A such that it can rotate in the circumferential direction, and a plurality of (two in this embodiment) rod-like operating members 183 mounted to the mode switching sleeve 182.

A single (or possibly more) guide groove 107b is formed in the outer circumferential surface of the inner housing 107A. A ridge 182a is formed in the inner circumferential surface of the mode switching sleeve 182 and engaged with the guide groove 107b of the inner housing 107A, so that the mode switching sleeve 182 is prevented from moving in the longitudinal direction with respect to the inner housing 107A and in this state it can rotate around its longitudinal axis. The mode switching sleeve 182 can be turned by a user. As for this turning operation, although not shown, it may be constructed, for example, such that the mode switching sleeve 182 is directly operated by user's finger through an opening formed in the gear housing 107, or such that it is operated via a mode switching handle which is integrally formed with the mode switching sleeve 182 and exposed to the outside through an opening of the gear housing 107.

Further, (two) spiral slots (lead grooves) 182b corresponding in number to the operating members 183 are formed in the mode switching sleeve 182 on the same circumference and have a predetermined length in the circumferential direction. One axial end (proximal end) of each of the operating members 183 is slidably engaged in each of the slots 182b. The operating member 183 radially extends through a longitudinally extending slot 107c formed through the inner housing 107A and toward the middle of the intermediate shaft 123 within the inner housing 107A. Specifically, the operating member 183 is prevented from moving in the circumferential direction by the slot 107c, and in this state, it is allowed to move in the longitudinal direction along the slot 107c. Therefore, when the mode switching sleeve 182 is turned in one direction or the other direction, the operating member 183 slidably engaged in the associated slot 182b moves in one or the other longitudinal direction along the slot 107c of the inner housing 107A. By utilizing this movement (displacement) of the operating member 183 in the longitudinal direction, the operating conditions of the engagement clutch 141 are shifted. The position of the rotating end of the mode switching sleeve 182 turned in a direction LO in FIG. 18 is defined as a position of low speed mode, the rotating end of the mode switching sleeve 182 turned in a direction HI is defined as a position of high speed mode, and an intermediate position between the two positions is defined as a position of automatic transmission mode.

The distal end of the operating member 183 is inserted between the side of a spring receiving ring 184 for receiving one end of the clutch spring 144 and the side of the cover 167 fixed to the drive side clutch member 142. A cylindrical portion 184a is formed in the middle of the spring receiving ring 184 and protrudes in the longitudinal direction. The cylindrical portion 184a of the spring receiving ring 184 is loosely fitted onto a cylindrical portion 167a formed in the middle of the cover 167 and can move in the longitudinal direction with respect to the cylindrical portion 167a. Further, the end surface of the cylindrical portion 184a is in contact with the side of the cover 167. Thus, the biasing force of the clutch spring 144 is applied to the side of the drive side clutch member 142 via the cover 167. A predetermined space is formed between the side of the spring receiving ring 184 and the side of the cover 167 which face each other, and the distal end of the operating member 183 is inserted in the space.

The mode switching mechanism 181 according to this embodiment is constructed as described above. Therefore, when the mode switching sleeve 182 is placed, for example, in the position of automatic transmission mode, the distal end of the operating member 183 is moved toward the side of the spring receiving ring 184 and away from the side of the cover 167. The distance between the distal end of the operating member 183 and the side of the cover 167 in the longitudinal direction is set such that the drive side clutch member 142 can be disengaged from the driven side clutch member 143, or such that the cams 142a of the drive side clutch member 142 are allowed to be separated from the cams 143a of the driven side clutch member 143. This state is shown in FIGS. 4 and 5.

Thus, when the automatic transmission mode is selected, the sliding engagement clutch 141 can be operated as usual. Therefore, during operation on a workpiece by the circular saw 101, the power transmission path can be automatically shifted according to the load applied to the blade 113.

When the mode switching sleeve 182 is switched to the position of high speed mode, the distal end of the operating member 183 comes in contact with the side of the cover 167 of the drive side clutch member 142 placed in the power transmission position. This state is shown in FIG. 19. When the distal end of the operating member 183 is in contact with the side of the cover 167, during operation of the circular saw 101, the operating member 183 prevents the drive side clutch member 142 from moving in the clutch releasing direction, so that the sliding engagement clutch 141 is continuously held in the engaged state regardless of fluctuations of the load applied to the blade 113. Therefore, as described above, the torque of the driving motor 115 is transmitted to the blade 113 via the first power transmission path P1 passing through the sliding engagement clutch 141. Specifically, when the high speed mode is selected, the speed change mechanism 117 is fixed to the first power transmission path P1, and in this state, the blade 113 can be driven at high speed and low torque.

When the mode switching sleeve 182 is switched to the position of low speed mode, the distal end of the operating member 183 pushes the side of the spring receiving ring 184 away from the side of the cover 167. At this time, the distance between the end surface of the cylindrical portion 184a of the spring receiving ring 184 and the side of the cover 167 is set such that the drive side clutch member 142 can be disengaged from the driven side clutch member 143, and the drive side clutch member 142 is no longer acted upon by the biasing force of the clutch spring 144. This state is shown in FIG. 20.

In this state, when the circular saw 101 is driven and the cams 142a of the drive side clutch member 142 are subjected to the load from the cams 143a of the driven side clutch member 143, the drive side clutch member 142 is retracted to the power transmission interrupted position. Further, the cams 142a are held in the power transmission interrupted position in which the cams 142a are separated from the cams 143a of the driven side clutch member 143, by the action of the above-described torque ring 152. This state is shown in FIG. 21. Therefore, as described above, the torque of the driving motor 115 is transmitted to the blade 113 via the second power transmission path P2 passing through the one-way clutch 145. Specifically, when the low speed mode is selected, the speed change mechanism 117 is fixed to the second power transmission path P2, and in this state, the blade 113 can be driven at low speed and high torque.

Thus, by provision of the mode switching mechanism 181 according to this embodiment, the mode of the speed change mechanism 117 can be appropriately selected according to the thickness (cutting depth) or hardness of the workpiece, among the high speed mode in which the blade 113 is driven at high speed and low torque, the low speed mode in which it is driven at low speed and high torque, and the automatic transmission mode in which the transmission path is automatically switched between the high-speed and low-torque path and the low-speed and high-torque path. Thus the mode can be selected in accordance with the purpose, so that the convenience can be improved.

Second Embodiment of the Invention

Figure 22:
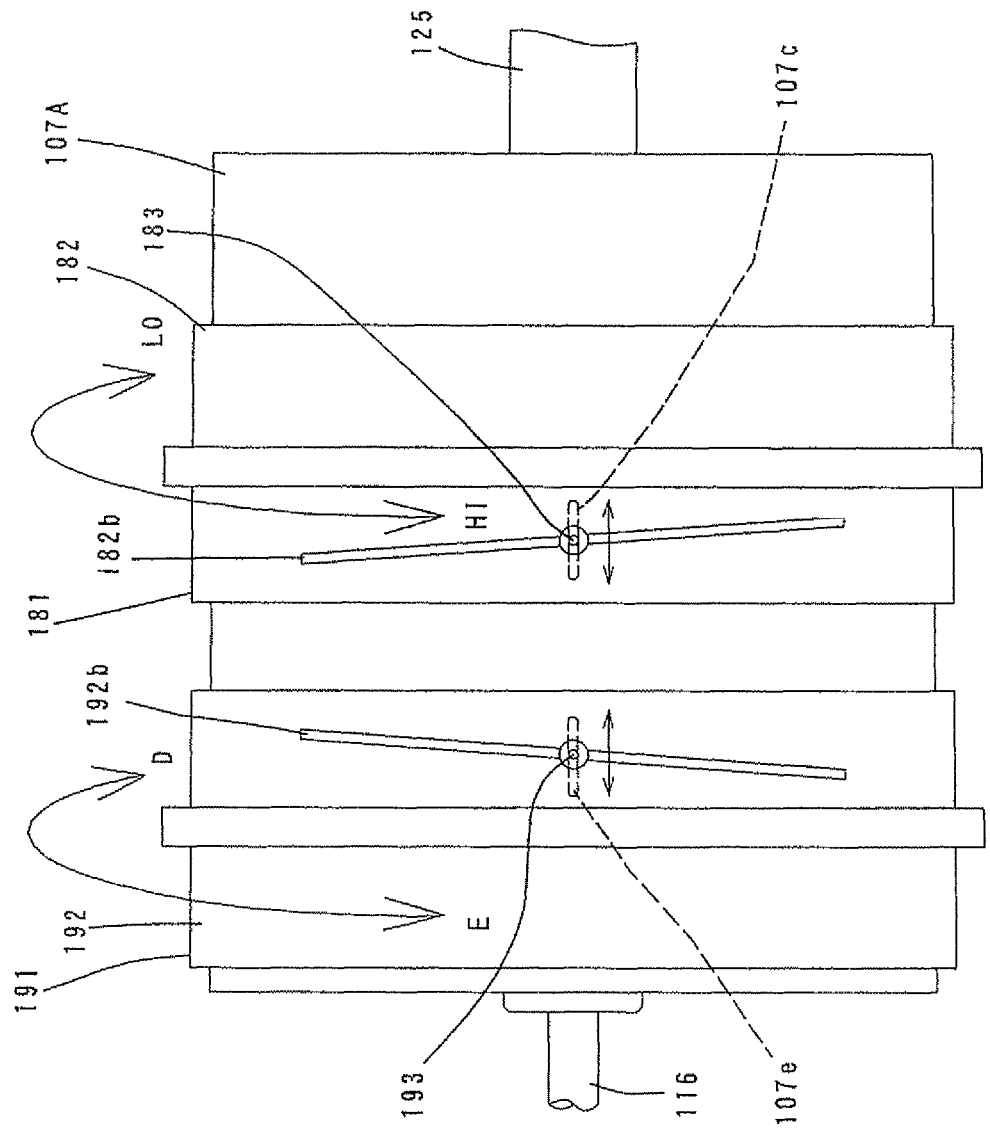
FIG. 22 is an external view showing the mode switching mechanism and a speed-change torque adjusting mechanism according to a second embodiment of the invention.
Figure 23:
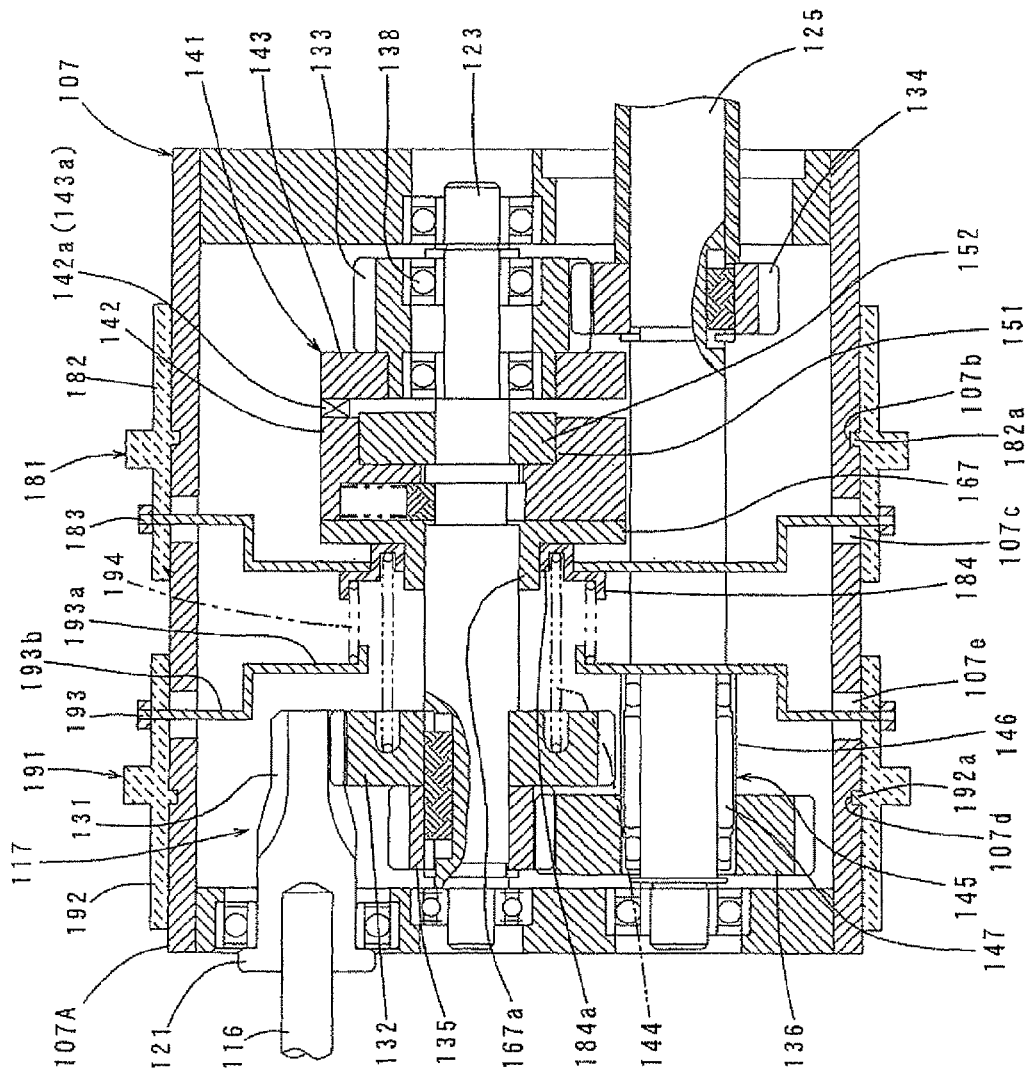
FIG. 23 is a developed sectional view also showing the mode switching mechanism and the speed-change torque adjusting mechanism.

A second embodiment of the invention is now explained with reference to FIGS. 22 and 23. FIG. 22 is an external view showing the mode switching mechanism 181 and a speed-change torque adjusting mechanism 191, and FIG. 23 is a developed sectional view thereof. In this embodiment, the speed-change torque adjusting mechanism 191 is provided which allows the user to arbitrarily adjust a switching set value for speed change (speed-change torque value) at which switching from the first power transmission path P1 to the second power transmission path P2 is effected. In the other points, this embodiment has the same construction as the above-described first embodiment. Therefore, components shown in FIGS. 22 and 23 are given like numerals as in the first embodiment and will not be described or briefly described. The speed-change torque adjusting mechanism 191 is disposed in juxtaposition with the above-described mode switching mechanism 181, and it functions when the automatic transmission mode is selected by the mode switching mechanism 181. The speed-change torque adjusting mechanism 191 is a feature that corresponds to the "switching set value adjusting mechanism" according to this invention.

The speed-change torque adjusting mechanism 191 is substantially designed to adjust the biasing force of a spring of the sliding engagement clutch 141 which defines the switching set value. In this embodiment, in addition to the existing clutch spring 144, an auxiliary clutch spring 194 is further provided, and the biasing force of the auxiliary clutch spring 194 can be adjusted. The speed-change torque adjusting mechanism 191 mainly includes a speed-change torque adjusting sleeve 192, and a spring receiving member 193 for adjusting the biasing force which is mounted to the speed-change torque adjusting sleeve 192.

Like the mode switching sleeve 182, the speed-change torque adjusting sleeve 192 is fitted onto the inner housing 107A such that it is prevented from moving in the longitudinal direction via a ridge 192a engaged in a guide groove 107d formed in the inner housing 107A and in this state it can rotate around its longitudinal axis. The spring receiving member 193 includes a spring receiving disc 193a which serves to receive one end of the auxiliary clutch spring 194 and a plurality of (two in this embodiment) arms 193b extending radially outward from the spring receiving disc 193a. Like the operating member 183, an end of each of the arms 193b extends through a longitudinally extending slot 107e formed through the inner housing 107A and is slidably engaged in each of spiral slots (lead grooves) 192b formed in the speed-change torque adjusting sleeve 192. Therefore, when the speed-change torque adjusting sleeve 192 is rotated in one direction or the other direction, the spring receiving member 193 slidably engaged in the associated slot 192b moves in one or the other longitudinal direction along the slot 107e of the inner housing 107A. By utilizing this movement (displacement) of the spring receiving member 193 in the longitudinal direction, the biasing force of the auxiliary clutch spring 194 is adjusted. The auxiliary clutch spring 194 is disposed between the spring receiving disc 193a of the spring receiving member 193 and the spring receiving ring 184 and biases the drive side clutch member 142 toward the power transmission position via the spring receiving ring 184.

Further, it is constructed such that the speed-change torque adjusting sleeve 192 can be turned in the same manner as the mode switching sleeve 182.

The speed-change torque adjusting mechanism 191 according to this embodiment is constructed as described above. Therefore, when the automatic transmission mode is selected by the mode switching mechanism 181 and the speed-change torque adjusting sleeve 192 is turned in a direction D in FIG. 22, the spring receiving member 193 moves away from the spring receiving ring 184 so that the biasing force of the auxiliary clutch spring 194 is reduced. When the speed-change torque adjusting sleeve 192 is turned in a direction E in FIG. 22, the spring receiving member 193 moves toward the spring receiving ring 184 so that the biasing force of the auxiliary clutch spring 194 is increased.

Thus, by provision of the speed-change torque adjusting mechanism 191 according to this embodiment, the user can arbitrarily adjust the switching set value for speed change, at which switching from the first power transmission path P1 to the second power transmission path P2 is effected, by adjusting the biasing force of the auxiliary clutch spring 194 of the sliding engagement clutch 141. Further, in this embodiment, the speed-change torque adjusting sleeve 192 is adjusted by turning like a screw via the guide groove 107d. With this construction, the switching set value for speed change can be steplessly adjusted, so that fine adjustment can be realized.

Figure 24:
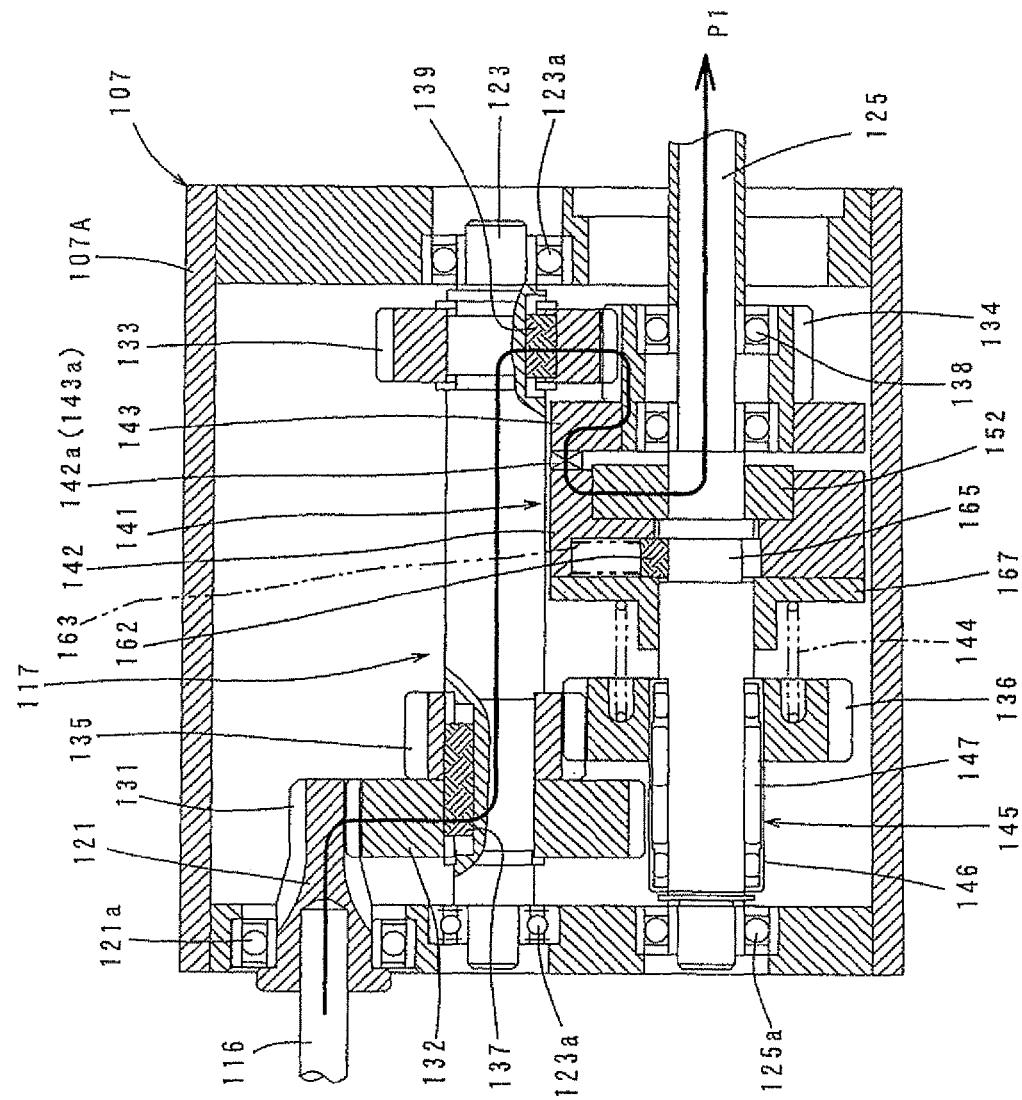
FIG. 24 is a developed sectional view showing a modification relating to the arrangement of the sliding engagement clutch in the speed change mechanism, in the state in which the power transmission path is switched to a high-speed low-torque path.
Figure 25:
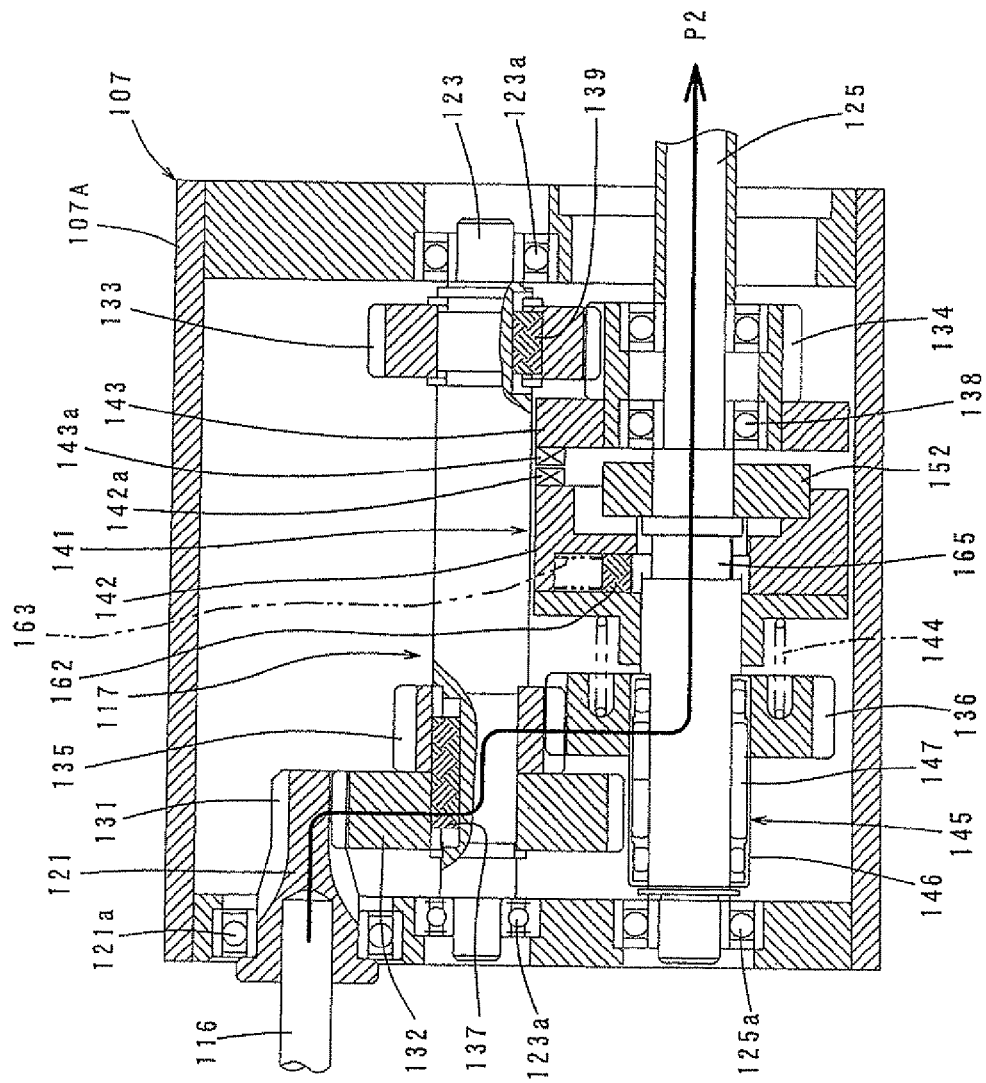
FIG. 25 is a developed sectional view showing the modification relating to the arrangement of the sliding engagement clutch in the speed change mechanism, in the state in which the power transmission path is switched to a low-speed high-torque path.

In the above-described first and second embodiments, the sliding engagement clutch 141 is disposed on the intermediate shaft 123, but it can be disposed on the output shaft 125 as shown in FIGS. 24 and 25. FIGS. 24 and 25 are developed sectional views showing the construction of the speed change mechanism 117. In FIGS. 24 and 25, the mode switching mechanism 181 and the speed-change torque adjusting mechanism 191 are not shown.

The sliding engagement clutch 141 is mounted on the output shaft 125. By this arrangement, the second intermediate gear 133 is fixedly mounted on the intermediate shaft 123 by the key 139, and the first driven gear 134 normally engaged with the second intermediate gear 133 is rotatably supported on the output shaft 125 via the bearing 138.

Further, the sliding engagement clutch 141 mainly includes the drive side clutch member 142, the driven side clutch member 143 and the clutch spring 144. In this point, this embodiment is the same as the above-described first embodiment. In this embodiment, however, the direction of transmission of power is opposite to that in the first embodiment in which the sliding engagement clutch 141 is mounted on the intermediate shaft 123. Specifically, the clutch member 143 which rotates together with the first driven gear 134 is on the drive side, and the clutch member 142 which rotates together with the output shaft 125 via the torque ring 152 is on the driven side. The clutch spring 144 is disposed between the driven side clutch member 142 and the second driven gear 136 to which the one-way clutch 145 is mounted and biases the driven side clutch member 142 toward the drive side clutch member 143.

Therefore, when the load applied to the blade 113 is low, the torque of the driving motor 115 is transmitted to the blade 113 via the first power transmission path P1 which is formed by the pinion gear 131 of the input shaft 121, the first intermediate gear 132, the intermediate shaft 123, the second intermediate gear 133, the first driven gear 134, the sliding engagement clutch 141 and the output shaft 125. Then the blade 113 is rotationally driven at high speed and low torque. This state is shown in FIG. 24.

When a load exceeding a switching set value defined by the clutch spring 144 and an auxiliary clutch spring is applied to the blade 113, the driven side clutch member 142 is moved from the power transmission position to the power transmission interrupted position against the biasing force of the clutch spring 144 and an auxiliary clutch spring. Thus, the cams 142a of the driven side clutch member 142 are disengaged from the cams 143a of the drive side clutch member 143. As a result, the torque of the driving motor 115 is transmitted to the blade 113 via the second power transmission path P2 which is formed by the pinion gear 131 of the input shaft 121, the first intermediate gear 132, the intermediate shaft 123, the third intermediate gear 135, the second driven gear 136, the one-way clutch 145 and the output shaft 125. Then the blade 113 is rotated at low speed and high torque. This state is shown in FIG. 25.

As described above, in this embodiment, like in the above-described first embodiment, the power transmission path can be switched from the first power transmission path P1 to the second power transmission path P2 in the state in which the gears in the gear trains forming the speed change mechanism 117 are held engaged with each other, or in which the positions of the gears are fixed. Therefore, speed changing operation can be performed with increased smoothness.

Specific settings for switching between the first power transmission path P1 and the second power transmission path P2 in the speed change mechanism 117 having the above-described construction are now described in detail. In the settings, at least a first setting mode and a second setting mode can be provided by appropriately selecting combinations of gears.

Figure 26:
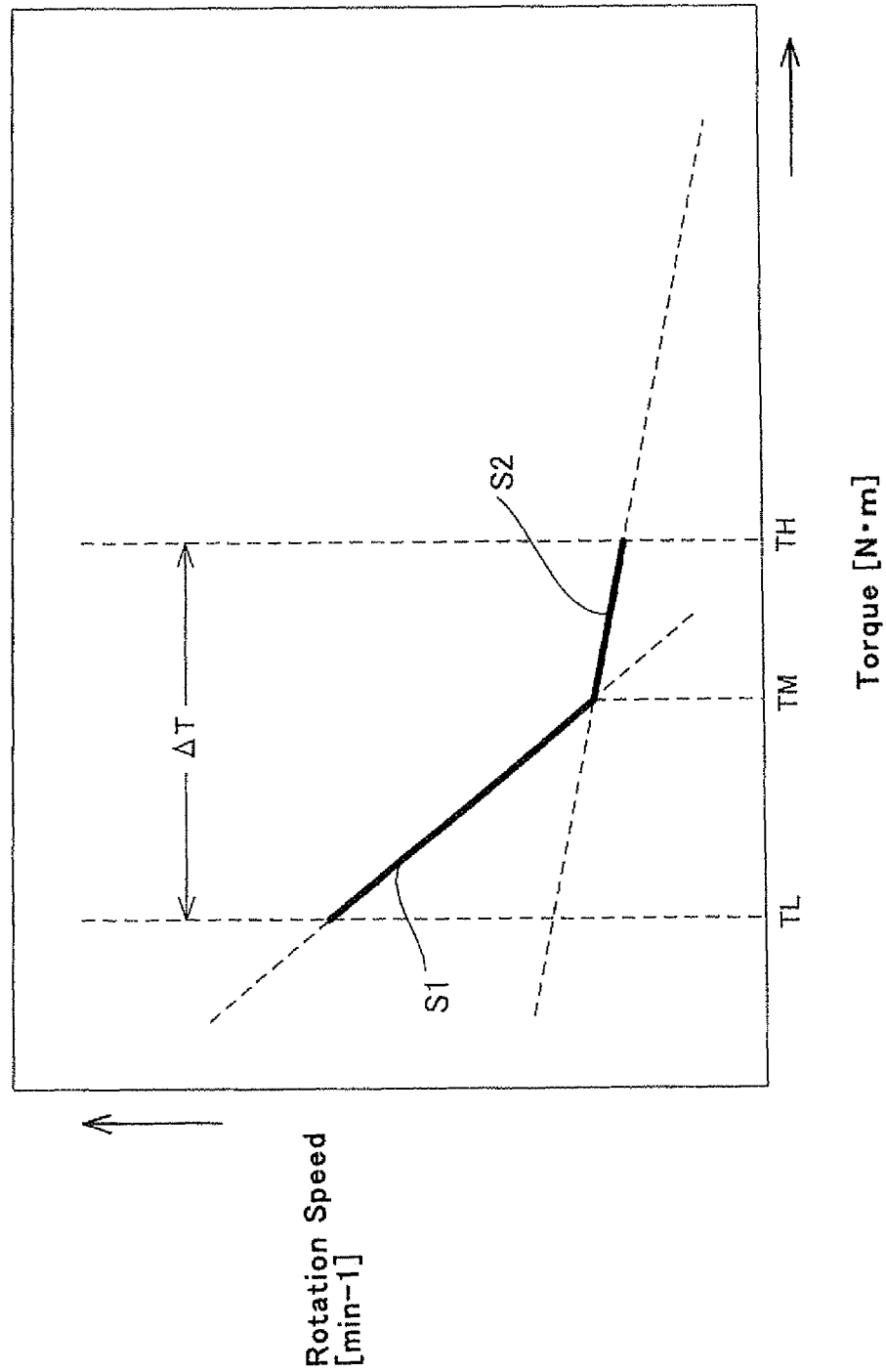
FIG. 26 is a graph relating torque (N·m) to rotation speed (min$^{-1}$) for rotation of the blade 113 of the driving motor 115 in this embodiment.
Figure 27:
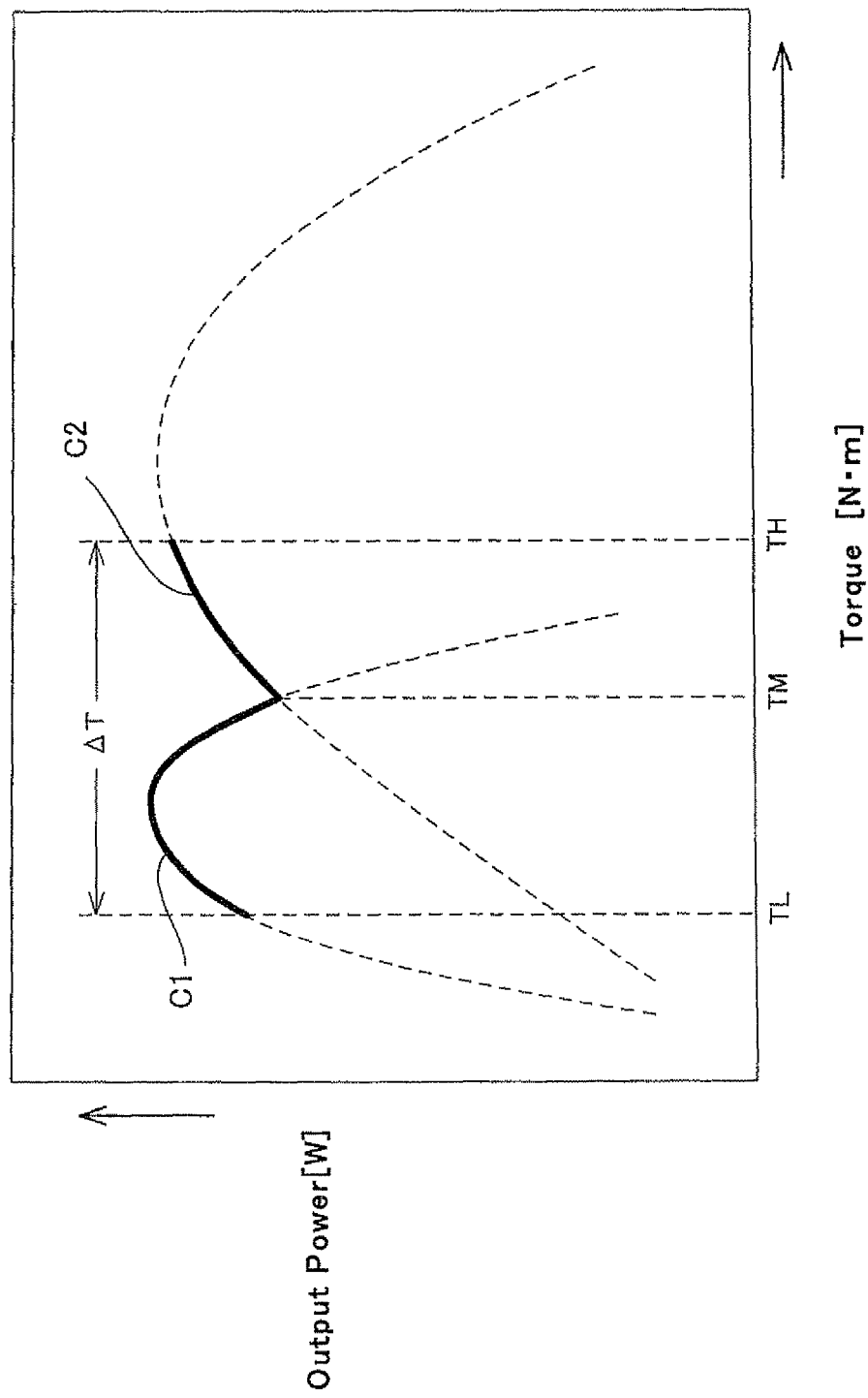
FIG. 27 is a graph relating torque (N·m) to output power (W) for rotation of the blade 113 of the driving motor 115 in this embodiment.
Figure 28:
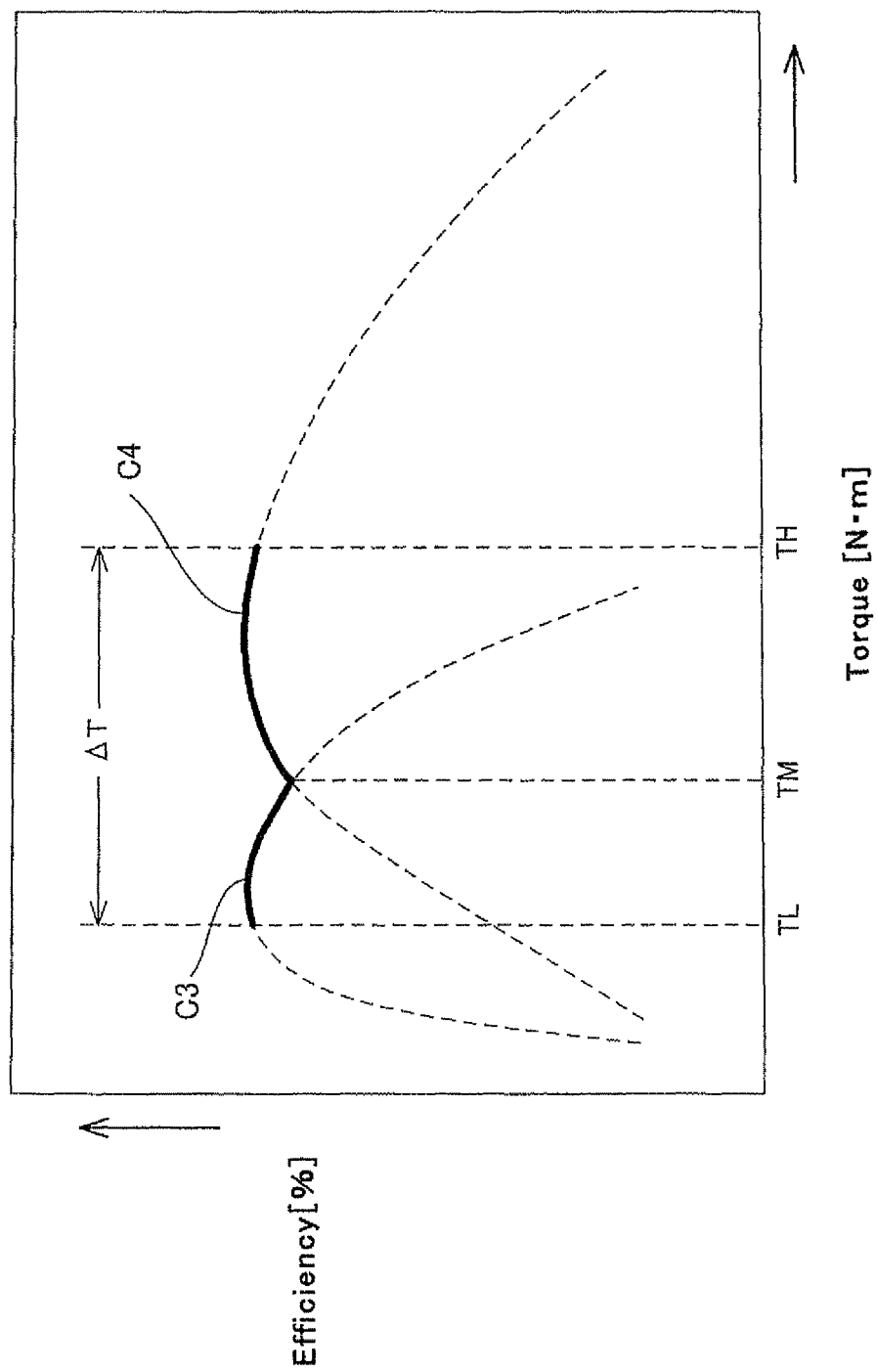
FIG. 28 is a graph relating torque (N·m) to efficiency (%) for rotation of the blade 113 of the driving motor 115 in this embodiment.

The first setting mode is defined as a setting mode in which the torque of the blade 113 is relatively low and its rotation speed is relatively high (high-speed low-torque mode), while the second setting mode is defined as a setting mode in which the torque of the blade 113 is relatively high and its rotation speed is relatively low (low-speed high-torque mode). Typical examples of the first and second setting modes are described with reference to 26 to 28. FIG. 26 is a graph relating torque (N·m) to rotation speed (min$^{-1}$) for rotation of the blade 113 of the driving motor 115 in this embodiment. FIG. 27 is a graph relating torque (N·m) to output power (W) for rotation of the blade 113 of the driving motor 115 in this embodiment. FIG. 28 is a graph relating torque (N·m) to efficiency (%) for rotation of the blade 113 of the driving motor 115 in this embodiment.

As shown in FIG. 26, in the first setting mode, the rotation speed characteristic of the blade 113 within a normal torque range ΔT between a minimum torque TL and a maximum torque TH is plotted in a first rotation speed characteristic line S1 in a region of torque lower than an intermediate torque TM between the minimum torque TL and the maximum torque TH. In the second setting mode, the rotation speed characteristic of the blade 113 within the normal torque range ΔT between the minimum torque TL and the maximum torque TH is plotted in a second rotation speed characteristic line S2 in a region of torque higher than the intermediate torque TM. The second rotation speed characteristic line S2 is plotted continuously from the first rotation speed characteristic line S1. Specifically, in this embodiment, a rotation speed characteristic line turns from the first rotation speed characteristic line under light load conditions (low load conditions) to the second rotation speed characteristic line under heavy load conditions (high load conditions) at the intermediate torque TM. In such rotation speed setting, compared with a construction in which only either one of the rotation speed characteristic lines is used, higher-speed rotation can be achieved, and particularly, the rotation speed can be increased under light load.

Further, as shown in FIG. 27, in the first setting mode, the output power characteristic of the blade 113 within the normal torque range ΔT between the minimum torque TL and the maximum torque TH is plotted in a generally inverted U-shaped first output power characteristic curve C1 having one peak (output power between the minimum torque TL and the intermediate torque TM in FIG. 27) in the region of torque lower than the intermediate torque TM between the minimum torque TL and the maximum torque TH. In the second setting mode, the output power characteristic of the blade 113 within the normal torque range ΔT between the minimum torque TL and the maximum torque TH is plotted in a generally inverted U-shaped second output power characteristic curve C2 having one peak (output power at the maximum torque TH in FIG. 27) in a region of torque higher than the intermediate torque TM. The second output power characteristic curve C2 is plotted continuously from the first output power characteristic curve C1. Specifically, in this embodiment, an output power characteristic curve changes at the intermediate torque TM at the point of change from the light load condition to the heavy load condition. The minimum torque TL here is defined based on the minimum cutting depth of cutting a workpiece by the blade 113, and the maximum torque TH here is defined based on the maximum cutting depth of cutting the workpiece by the blade 113. Further, the intermediate torque TM can be defined as a specified value or a specified numerical range by setting of the biasing force of the clutch spring 144. In such output power setting, compared with a construction in which only either one of the output power characteristic curves is used, higher output power can be obtained with stability. Further, the torque may be defined not only based on the depth of cutting the workpiece, but based on the kind of materials of the workpiece or the way of cutting the workpiece (square cutting, oblique cutting, etc.).

Further, as shown in FIG. 28, in the first setting mode, the efficiency characteristic of the blade 113 within the normal torque range ΔT between the minimum torque TL and the maximum torque TH is plotted in a generally inverted U-shaped first efficiency characteristic curve C3 having one peak (efficiency between the minimum torque TL and the intermediate torque TM in FIG. 28) in the region of torque lower than the intermediate torque TM between the minimum torque TL and the maximum torque TH. In the second setting mode, the efficiency characteristic of the blade 113 within the normal torque range ΔT between the minimum torque TL and the maximum torque TH is plotted in a generally inverted U-shaped second efficiency characteristic curve C4 having one peak (efficiency between the intermediate torque TM and the maximum torque TH in FIG. 28) in a region of torque higher than the intermediate torque TM. The second efficiency characteristic curve C4 is plotted continuously from the first efficiency characteristic curve C3. Specifically, in this embodiment, an efficiency characteristic curve changes at the intermediate torque TM at the point of change from the light load condition to the heavy load condition. In such efficiency setting, compared with a construction in which only either one of the efficiency characteristic curves is used, higher efficiency can be obtained with stability. Particularly, in the second setting mode during heavy load conditions, the gear ratio can be set to allow production of higher torque, so that locking can be prevented which may occur in use of a large-diameter blade which is subjected to heavy load. Thus, a large-diameter blade can be installed.

With such settings in the speed change mechanism 117 of this embodiment, by providing at least two setting modes according to the load torque on the output shaft 125, cutting operation can be smoothly performed in response to change of load torque produced during cutting operation. Thus, the cutting operation can be performed with increased smoothness. Further, compared with a speed change mechanism which is placed only in either one of the two setting modes, the output power and the efficiency can be stabilized at higher levels. Particularly, in the first setting mode during light load conditions, the rotation speed of the blade 113 can be increased, while, in the second setting mode during heavy load conditions, the gear ratio can be set to allow production of high torque so that a large-diameter blade can be installed. Therefore, the maximum cutting ability can be improved.

In the case of a circular saw of the type which is powered only by a battery, the efficiency can be stabilized at higher levels, so that improved work rate or increased speed can be realized. Moreover, even a DC machine having low torque can offer better usability like an AC machine. Further, in the case of a circular saw of the type which uses a battery (DC) and AC power, the output power can be stabilized at higher levels, so that the frequency of occurrence of locking of the blade 113 during heavy load conditions can be reduced or the lock torque can be increased, and the current drain can be reduced. Therefore, the driving motor 115 can be prevented from being burnt, and the battery can be protected against overcurrent. Further, the cutting speed can be increased by optimum setting appropriate to the materials of the workpiece. Furthermore, fine cutting can be realized by increasing the peripheral speed of the blade 113. Therefore, the finish of the cutting face (in terms of burrs and surface roughness) can be improved.

Further, in this invention, in addition to the first and second setting modes in this embodiment, a further different setting mode may be provided. Further, it can be designed such that a generally inverted U-shaped output power characteristic curve having at least one peak or a generally inverted U-shaped efficiency characteristic curve having at least one peak is plotted in the first and second setting modes as necessary.

Further, in the speed change mechanism 117 of this embodiment, preferably, the ratio of a second torque at the peak of the second output power characteristic curve C2 in the second setting mode to a first torque at the peak of the first output power characteristic curve C1 in the first setting mode is 1.5 to 2.5. Also preferably, the ratio of a second torque at the peak of the second efficiency characteristic curve C4 in the second setting mode to a first torque at the peak of the first efficiency characteristic curve C3 in the first setting mode is 1.5 to 2.5. Further, in the speed change mechanism 117 of this embodiment, preferably, the ratio of the second gear ratio of the second driven gear 136 to the third intermediate gear 135 to the first gear ratio of the first driven gear 134 to the second intermediate gear 133 is 1.5 to 2.5. By such setting of the torque and the gear ratio, the speed change mechanism which can more smoothly perform speed changing operation can be practicably constructed.

Further, switching between the first setting mode and the second setting mode may be automatically performed based on information actually detected by a mechanical detecting mechanism using a clutch spring 144 like in the above-described embodiments or by an electrical detecting mechanism, for example, using a sensor for detecting torque continuously or intermittently. Alternatively, the switching may be manually performed by user's operation of an operation member. Further, in the above-described embodiments, the second setting mode is described as being retained by the latching mechanism 151, but in a construction in which the latching mechanism 151 is not provided, switching from the first setting mode to the second setting mode is effected when the detected torque exceeds the intermediate torque, while switching from the second setting mode to the first setting mode is effected when the detected torque decreases to below the intermediate torque.

Further, the speed change mechanism 117 according to this embodiment is described as being of a parallel three-shaft type, but it may be of a two-shaft type having two parallel shafts, or an input shaft and an output shaft. Further, it may be of a type in which the one-way clutch 145 is disposed on the intermediate shaft 123 side. Further, the speed change mechanism 117 of this embodiment is described as having the gears of normally engaged type, but the invention can also be applied to a speed change mechanism of the type in which the gears are temporarily disengaged as necessary. Further, in this invention, at least one of the latching mechanism 151, the speed change preventing mechanism (switching preventing mechanism) 161 and the speed-change torque adjusting mechanism (switching set value adjusting mechanism) 191 can also be appropriately omitted as necessary. Further, in this invention, a clutch other than the sliding engagement clutch 141 in this embodiment, such as an electromagnetic clutch, can also be used. Further, in this embodiment, the battery-powered circular saw 101 is described, but it is not limited to this. This invention can be applied to an AC-powered circular saw as well as the battery-powered circular saw, and to a tabletop circular saw and a tabletop slide circular saw which perform a cutting operation on a workpiece placed on a table of a base, as well as the hand-held circular saw as shown in the drawings, and also to a circular saw for woodworking, metalworking or ceramics or for cutting plastic. In this case, the saw blade includes a chip saw, a blade, a cutting grinding wheel and a diamond wheel.

DESCRIPTION OF NUMERALS 101 circular saw (power tool)
103 circular saw body (power tool body)
104 blade case
105 motor housing
106 safety cover
107 gear housing
107A inner housing
107L lower end surface
107b spiral groove
107c slot
107d spiral groove
107e slot
108 battery
109 handgrip
109a trigger
111 base
111a opening
113 blade
115 driving motor
116 motor shaft
117 speed change mechanism
121 input shaft
121a bearing
123 intermediate shaft (first rotating shaft)
123a bearing
125 output shaft (second rotating shaft)
125a bearing
125A proximal shaft part
125B distal shaft part
125Aa flange
125Ba flange
131 pinion gear
132 first intermediate gear
133 second intermediate gear
134 first driven gear
135 third intermediate gear
136 second driven gear
137 key
138 bearing
139 key
141 sliding engagement clutch (first clutch)
142 drive side clutch member
142a cam
143 driven side clutch member
143a cam
144 clutch spring
145 one-way clutch (second clutch)
146 outer ring
146a cam groove
146b cam face
147 needle roller
148 spring
151 latching mechanism
152 torque ring
152a protrusion
153 housing space
153a engagement recess
153b torque transmission surface
153c inclined surface
153d stopper surface
154 toque limiter 155 friction plate
156 leaf spring
161 speed change preventing mechanism (switching preventing mechanism)
162 stopper (movement preventing member)
163 compression coil spring
164 stopper housing recess
165 annular groove (engagement part)
166 guide pin
167 cover
167a cylindrical portion
171 electromagnetic solenoid
172 stopper (movement preventing member)
175 motor control circuit (motor control device)
176 starting switch
177 control section
178 switching element
181 mode switching mechanism
182 mode switching sleeve
183 operating member
184 spring receiving ring
184a cylindrical portion
191 speed-change torque adjusting mechanism
192 torque adjusting sleeve
192a ridge
193 spring receiving member
193a disc
193b arm

The invention claimed is:

1. A circular saw for use with a workpiece comprising:
a power source;
a saw blade, which is rotationally driven to cut the workpiece;
a speed change mechanism which is disposed between the power source and the saw blade, the speed change mechanism changing rotation speed of the saw blade, wherein the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path; and
a first clutch which allows and interrupts power transmission on the first power transmission path and a second clutch which allows and interrupts power transmission on the second power transmission path, wherein the power transmission path is switched between the first and second power transmission paths while the first and second gear trains are held engaged, by shifting of the first clutch to allow and interrupt power transmission along the first power transmission path and shifting of the second clutch to allow and interrupt power transmission along the second power transmission path.

2. The circular saw as defined in claim 1, further comprising an input shaft which is driven by the power source, wherein the input shaft is connected to the first rotating shaft by engagement of gears and the second rotating shaft comprises an output shaft of the saw blade, and wherein the circular saw is of a parallel three-shaft type in which the input shaft is also disposed parallel to the parallel first and second rotating shafts.

3. The circular saw as defined in claim 1, wherein at least one of the first and second clutches comprises a drive side clutch member and a driven side clutch member which are opposed to each other on the first or second rotating shaft, and one of the drive side clutch member and the driven side clutch member comprises a sliding engagement clutch which can slide in a longitudinal direction between a power transmission position in which the clutch members are placed in the power transmission state by engagement with each other and a power transmission interrupted position in which the clutch members are placed in the power transmission interrupted state by disengagement from each other, according to torque on the saw blade.

4. The circular saw as defined in claim 3, wherein the speed change mechanism includes a latching mechanism, and once the sliding engagement clutch is shifted to the power transmission interrupted state, the latching mechanism retains the shifted state.

5. The circular saw as defined in claim 4, wherein the speed change mechanism includes a reset mechanism that returns the sliding engagement clutch to the power transmission state when the power source is stopped.

6. The circular saw as defined in claim 3, wherein the speed change mechanism further includes a switching preventing mechanism which prevents the sliding engagement clutch from switching between the power transmission state and the power transmission interrupted state by inertia of the saw blade at the time of startup of the power source.

7. The circular saw as defined in claim 3, wherein the speed change mechanism further includes a switching set value adjusting mechanism which is operated by a user, and the switching set value adjusting mechanism adjusts a switching set value at which the transmission path is switched between the power transmission state and the power transmission interrupted state.

8. The circular saw as defined in claim 1, wherein, with regard to an output power characteristic or efficiency characteristic of the saw blade within a normal torque range between a minimum torque which is defined based on minimum cutting depth of cutting the workpiece by the saw blade and a maximum torque which is defined based on maximum cutting depth of cutting the workpiece by the saw blade, the speed change mechanism offers a first setting mode in which the characteristic is plotted in a generally inverted U-shaped first characteristic curve having at least one peak in a region of torque lower than an intermediate torque between the minimum torque and the maximum torque, and a second setting mode in which the characteristic is plotted in a generally inverted U-shaped second characteristic curve having at least one peak in a region of torque higher than the intermediate torque.

9. A circular saw comprising a power source, a saw blade which is rotationally driven to cut a workpiece and a speed change mechanism which is disposed between the power source and the saw blade, the speed change mechanism changing rotation speed of the saw blade,
wherein with regard to an output power characteristic or efficiency characteristic within a normal torque range between a minimum torque which is defined based on minimum cutting depth of cutting the workpiece by the saw blade and a maximum torque which is defined based on maximum cutting depth of cutting the workpiece by the saw blade, the speed change mechanism has a first setting mode in which the characteristic is plotted in a generally inverted U-shaped first characteristic curve having at least one peak in a region of torque lower than an intermediate torque between the minimum torque and the maximum torque, and a second setting mode in which the characteristic is plotted in a generally inverted U-shaped second characteristic curve having at least one peak in a region of torque higher than the intermediate torque.

10. The circular saw as defined in claim 9, wherein, in the speed change mechanism, a ratio of a second torque at the peak of the second characteristic curve in the second setting mode to a first torque at the peak of the first characteristic curve in the first setting mode is 1.5 to 2.5.

11. The circular saw as defined in claim 9, wherein:

the speed change mechanism has a first power transmission path for transmitting torque of an input shaft which is driven by the power source to an output shaft of the saw blade in the first setting mode, and a second power transmission path for transmitting torque of the input shaft to the output shaft in the second setting mode, the first power transmission path includes a first drive gear which is connected to the input shaft, and a first driven gear which is engaged with the first drive gear and connected to the output shaft, the second power transmission path includes a second drive gear which is connected to the input shaft, and a second driven gear which is engaged with the second drive gear and connected to the output shaft, and a ratio of a second gear ratio of the second driven gear to the second drive gear to a first gear ratio of the first driven gear to the first drive gear is 1.5 to 2.5.

12. The circular saw as defined in claim 9, including a detecting mechanism for detecting torque on the saw blade, wherein the speed change mechanism switches from the first setting mode to the second setting mode when the detected torque exceeds the intermediate torque, while it switches from the second setting mode to the first setting mode when the detected torque decreases to below the intermediate torque.

* * * * *